(12) United States Patent
Xu et al.

(10) Patent No.: US 9,174,380 B2
(45) Date of Patent: Nov. 3, 2015

(54) SELF-CLEANING PLASTICIZING VENTING AND EXTRUDING APPARATUS BY CO-ROTATING NON-TWIN MULTI-SCREWS AND METHOD THEREOF

(75) Inventors: Baiping Xu, Guangzhou (CN); Meigui Wang, Guangzhou (CN); Liang He, Guangzhou (CN); Ping Kong, Guangzhou (CN); Jinwei Chen, Guangzhou (CN)

(73) Assignee: GUANGDONG INDUSTRY TECHNICAL COLLEGE, Guangzhou (CN)

( * ) Notice: Subject to any disclaimer, the term of this patent is extended or adjusted under 35 U.S.C. 154(b) by 40 days.

(21) Appl. No.: 13/703,894

(22) PCT Filed: Jun. 9, 2011

(86) PCT No.: PCT/CN2011/075550
§ 371 (c)(1),
(2), (4) Date: Dec. 12, 2012

(87) PCT Pub. No.: WO2011/153951
PCT Pub. Date: Dec. 15, 2011

(65) Prior Publication Data
US 2013/0089634 A1 Apr. 11, 2013

(30) Foreign Application Priority Data

Jun. 12, 2010 (CN) .......................... 2010 1 0201316
Jun. 7, 2011 (CN) .......................... 2011 1 0149868

(51) Int. Cl.
*B29C 47/40* (2006.01)
*B29C 47/76* (2006.01)
(Continued)

(52) U.S. Cl.
CPC ......... *B29C 47/0881* (2013.01); *B29C 47/0861* (2013.01); *B29C 47/40* (2013.01);
(Continued)

(58) Field of Classification Search
CPC ............ B29C 47/0844; B29C 47/0847; B29C 47/0861; B29C 47/40; B29C 47/402; B29C 47/406; B29C 47/408; B29C 47/62; B29C 47/622; B29C 47/627; B29C 47/662; B29C 47/163; B29C 47/767; B29C 47/0011; B29C 47/0881; B29C 47/60; B29C 47/625; B29C 47/663; B29C 47/765
USPC ................................ 425/203, 204; 366/75, 85
See application file for complete search history.

(56) References Cited

U.S. PATENT DOCUMENTS 2,802,238 A     8/1957   Colombo
4,131,371 A * 12/1978   Tynan ........................... 366/301
(Continued)

FOREIGN PATENT DOCUMENTS

CN     101879777 A    11/2010
JP      S50-146660 A    11/1975

OTHER PUBLICATIONS

International Search Report, issued in related PCT Application No. CN2011/075550, mailed Sep. 22, 2011, 5 pages.
(Continued)

*Primary Examiner* — Yogendra Gupta
*Assistant Examiner* — Joseph Leyson
(74) *Attorney, Agent, or Firm* — Davis Wright Tremaine LLP

(57) ABSTRACT

A self-cleaning plasticizing venting and extruding apparatus by co-rotating non-twin multi-screws and a method thereof are provided, said apparatus comprises a screw mechanism, barrel, feeding port, venting port, discharging port, and driving mechanism. Said screw mechanism comprises non-uniform central screw and lateral screws, the axis of the central screw coincides with the barrel, and the lateral screws are provided on both sides of the central screw and engaged with the central screw; the contour lines of the threads of said central screw and said lateral screws are tangent to the inner wall of the barrel; and said driving mechanism is connected to the central screw and lateral screws. Each screw-uses an asymmetrical flow channel shape, so the flow space is asymmetric, and the compounding intensity and effectiveness enhanced. The dispersion and mixing effects are excellent, generating a self-cleaning effect. The system is suitable for high yield nano-material processing.

7 Claims, 4 Drawing Sheets

(51) Int. Cl.
*B29C 47/08* (2006.01)
*B29C 47/60* (2006.01)
*B29C 47/62* (2006.01)
*B29C 47/66* (2006.01)
*B29C 47/00* (2006.01)

(52) U.S. Cl.
CPC ............ *B29C 47/402* (2013.01); *B29C 47/406* (2013.01); *B29C 47/408* (2013.01); *B29C 47/60* (2013.01); *B29C 47/62* (2013.01); *B29C 47/625* (2013.01); *B29C 47/765* (2013.01); *B29C 47/767* (2013.01); *B29C 47/0011* (2013.01); *B29C 47/662* (2013.01); *B29C 47/663* (2013.01)

(56) References Cited

U.S. PATENT DOCUMENTS

| | | | | |
|---|---|---|---|---|
| 5,048,971 | A | * | 9/1991 | Wall et al. ........................ 366/85 |
| 6,129,873 | A | * | 10/2000 | Shelby et al. .................. 264/102 |
| 7,025,491 | B2 | * | 4/2006 | Blach et al. ..................... 366/85 |
| 7,284,897 | B2 | * | 10/2007 | Blach ............................. 366/75 |
| 7,654,725 | B2 | * | 2/2010 | Sturm et al. .................... 366/85 |
| 2008/0181051 | A1 | * | 7/2008 | Yamaguchi et al. ........... 366/133 |
| 2008/0248152 | A1 | * | 10/2008 | Samann et al. ................ 425/208 |

OTHER PUBLICATIONS

Written Opinion of the International Searching Authority, issued in related PCT Application No. CN2011/075550, mailed Sep. 22, 2011, 5 pages.

* cited by examiner

SELF-CLEANING PLASTICIZING VENTING AND EXTRUDING APPARATUS BY CO-ROTATING NON-TWIN MULTI-SCREWS AND METHOD THEREOF

CROSS-REFERENCE TO RELATED APPLICATIONS

The present application is a U.S. National Stage entry under 35 U.S.C. §371 of International Application No. PCT/CN2011/075550, filed on Jun. 9, 2011, designating the United States of America and published in Chinese on Dec. 15, 2011, which in turn claims priority to Chinese Application No. 201010201316.9, filed on Jun. 12, 2010 and Chinese Application No. 201110149868.4, filed on Jun. 7, 2011, each of which is hereby incorporated by reference in its entirety.

TECHNICAL FIELD

The present invention relates to a processing technique for plasticizing, venting and extruding polymeric materials, particularly to a self-cleaning plasticizing venting and extruding apparatus by co-rotating non-twin multi-screws and method thereof.

BACKGROUND ART

The co-rotating twin-screw extruders have been widely applied in the fields such as filling, modifying, blending, and reactive extruding polymeric materials, etc. The principle is that: the structures of the two screws are identical, when assembled, there is a certain phase angle between them, the centerline distance is related to the number of screw tips and the peak angle, and the rotation speeds of the two screws are the same during the processing process. To achieve the self-cleaning effect during the processing process, from the viewpoint of relative movement, the two screws keep constant in the phase therebetween, contact and make a translational movement each other. Although this structure can preliminarily solve the problems such as the poor mixing property, the poor self-cleaning property, and the poor venting effect, etc., during the material processing process, there are still the following defects: (1) as the shapes of the two screws are the same, there are consistency (symmetry) therebetween, so that there is a consistency in the geometrical space through which the fluids pass during they proceeding along the two screws, there is an absence in the conversion between the geometric shapes of the spaces for processing the fluids, the reorientation effect of the interface during the shearing process is attenuated, and the mixing effect is limited, especially, that most of the fluid mixing in the core region of the screw channels is still laminar mixing, and the interface is increased linearly with time; and (2) the studies have shown that the co-rotating twin screws can only make an effective mixing effect on the surface layer fluid near the wall region, especially in the engaging region, the effect is extraordinarily obvious, in general, and there is still an extremely large possibility for improvement in the fluid mixing in the core regions.

For this, as required, there is a need for providing an extruding process with a self-cleaning effect, and a well-mixing effect.

CONTENTS OF THE INVENTION

The primary purpose of the present invention is to overcome the defects and deficiencies in the prior art, to provide a self-cleaning plasticizing venting and extruding apparatus by co-rotating non-twin multi-screws having good plasticizing and mixing effects and having a self-cleaning effect during the polymeric materials processing process.

Another purpose of the present invention is to provide a self-cleaning plasticizing venting and extruding method by co-rotating non-twin multi-screws carried out by the above-mentioned apparatus.

The purposes of the present invention are carried out by the following technical solutions: a self-cleaning plasticizing venting and extruding apparatus by co-rotating non-twin multi-screws, comprising a screw mechanism, a barrel, a feeding port, a venting port, a discharging port, and a driving mechanism, wherein said driving mechanism is provided at the ends of the barrel respectively, and is connected to the screw mechanism; said screw mechanism is provided inside the barrel, and placed horizontally, and the inner section of the barrel is divided into a solid transporting zone, a melting zone, a venting zone and a compounding and extruding zone; said feeding port is provided above the barrel of the solid transporting zone, said venting port is provided above the barrel of the venting zone, both the feeding port and the venting port are communicated with the barrel; said discharging port is provided at the end of the barrel, said screw mechanism comprises non-uniform shaped central screw and lateral screws, the axis of the central screw is coincided with that of the barrel, the lateral screws are engaged with the central screw, and the contour lines of the threads of the central screw and the lateral screws are all tangent to the inner wall of the barrel; and said driving mechanism is connected to the central screw and the lateral screws respectively.

Said driving mechanism comprises a main electric motor and a toothed gearing mechanism which are interconnected with each other, and said toothed gearing mechanism is connected to the central screw and the lateral screws respectively. The peak angle of the screw ridge of said central screw is in a range of 0-180° (ie., the peak angle of the ridge of the screw in the cross-section of the vertical axis is in a range of 0-180°).

The rotation speeds of the central screw and the lateral screws can be the same, or different.

As a preferred embodiment, said lateral screws are two screws, left screw and right screw, which are provided on both sides of the central screw respectively, and both engaged with the central screw; the inner cavity of said barrel is consisted of three cylinder grooves which are communicated, each of the cylinder grooves are fitted with the left screw, the central screw and the right screw respectively; and the central axis distance from the cylinder grooves on both sides to the cylinder groove at the central position is equal to the centerline distance from the central screw to the left screw, and the right screw.

The phase angle difference between the positions of said left screw and said right screw is 0°, 90°, or 180°.

With the center points of the cylinder grooves of the barrel corresponding to the central screw and each of the lateral screws respectively as poles, and the rays elicited horizontally rightwards from the poles as polar axes, the shape curve of the cross-section of said central screw meets that:

$$\text{when } 0° \leq \theta \leq 25°,\ \rho(\theta) = \begin{pmatrix} 0.32256 + 0.00392\theta + 0.000309497\theta^2 - \\ 2.57326 \times 10^{-5}\theta^3 + 9.28644 \times 10^{-7}\theta^4 + \\ 1.8713 \times 10^{-8}\theta^5 - 8.12786 \times 10^{-10}\theta^6 - \\ 9.61005 \times 10^{-12}\theta^7 \end{pmatrix} D_0;$$

-continued when $25° \leq \theta \leq 63°$, $\rho(\theta) = 0.5\, D_0$;

when $63° \leq \theta \leq 123°$, $$\rho(\theta) = \begin{pmatrix} 0.5 + 0.000823(\theta - 63) - 0.00134(\theta - 63)^2 + \\ 8.00734 \times 10^{-5}(\theta - 63)^3 - 2.14653 \times 10^{-6} \\ (\theta - 63)^4 + 2.76223 \times 10^{-8}(\theta - 63)^5 - \\ 1.37762 \times 10^{-10}(\theta - 63)^6 \end{pmatrix} D_0;$$

when $123° \leq \theta \leq 147°$, $$\rho(\theta) = \begin{pmatrix} 0.25291 - 0.00207(\theta - 123) + \\ 0.000573645(\theta - 123)^2 - 8.45874 \times 10^{-5} \\ (\theta - 123)^3 + 6.53416 \times 10^{-6}(\theta - 123)^4 - \\ 2.56256 \times 10^{-7}(\theta - 123)^5 + 4.47098 \times \\ 10^{-9}(\theta - 123)^6 - 2.03618 \times 10^{-11}(\theta - 123)^7 \end{pmatrix} D_0;$$

when $147° \leq \theta \leq 205°$, $$\rho(\theta) = \begin{pmatrix} 0.25374 + 0.000730048(\theta - 147) - \\ 0.000156535(\theta - 147)^2 + 3.73081 \times 10^{-5} \\ (\theta - 147)^3 - 3.07839 \times 10^{-6}(\theta - 147)^4 + \\ 1.32913 \times 10^{-7}(\theta - 147)^5 - 3.10949 \times 10^{-9} \\ (\theta - 147)^6 + 3.74465 \times 10^{-11}(\theta - 147)^7 - \\ 1.81606 \times 10^{-13}(\theta - 147)^8 \end{pmatrix} D_0;$$

when $205° \leq \theta \leq 243°$, $\rho(\theta) = 0.5 D_0$;

when $243° \leq \theta \leq 307°$, $$\rho(\theta) = \begin{pmatrix} 0.5 + 0.00369(\theta - 243) - 0.00226(\theta - 243)^2 + \\ 0.000184965(\theta - 243)^3 - 794221 \times 10^{-6}(\theta - 243)^4 + \\ 2.00615 \times 10^{-7}(\theta - 243)^5 - 2.9807 \times 10^{-9}(\theta - 243)^6 + \\ 2.4097 \times 10^{-11}(\theta - 243)^7 - 8.17763 \times 10^{-14}(\theta - 243)^8 \end{pmatrix} D_0;$$

when $307° \leq \theta \leq 323°$, $$\rho(\theta) = \begin{pmatrix} 0.2568 - 0.00882(\theta - 307) + 0.00414(\theta - 307)^2 - \\ 0.000908651(\theta - 307)^3 + 0.000100777(\theta - 307)^4 - \\ 5.50309 \times 10^{-6}(\theta - 307)^5 + 1.20454 \times 10^{-7}(\theta - 307)^6 - \\ 1.95559 \times 10^{-10}(\theta - 307)^7 \end{pmatrix} D_0;$$

when $323° \leq \theta \leq 360°$, $$\rho(\theta) = \begin{pmatrix} 0.25618 + 0.00082668(\theta - 323) - 0.000319894 \\ (\theta - 323)^2 + 4.17742 \times 10^{-5}(\theta - 323)^3 - 2.08266 \times \\ 10^{-6}(\theta - 323)^4 + 4.80871 \times 10^{-8}(\theta - 323)^5 - 4.18424 \times \\ 10^{-10}(\theta - 323)^6 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw;

the shape of the cross-section of said left screw is the same as the curve shape formed after the cross-section of the right screw is rotated counterclockwise by 180° along the center point of the cylinder groove of the barrel corresponding to the central screw; the shape curve of the cross-section of said right screw meets that:

when $0° \leq \theta \leq 80°$, $$\rho(\theta) = \begin{pmatrix} 0.28446 + 0.00173\theta - 4.07776 \times 10^{-6}\theta^2 + \\ 4.49932 \times 10^{-7}\theta^3 - 3.26681 \times 10^{-2}\theta^4 \end{pmatrix} D_0;$$

when $80° \leq \theta \leq 100°$, $$\rho(\theta) = \begin{pmatrix} 0.49331 + 0.00156(\theta - 80) + 3.82324 \times 10^{-6}(\theta - 80)^2 - \\ 4.32369 \times 10^{-5}(\theta - 80)^3 + 5.05212 \times 10^{-6}(\theta - 80)^4 - \\ 2.3955 \times 10^{-7}(\theta - 80)^5 + 4.02621 \times 10^{-3}(\theta - 80)^6 \end{pmatrix} D_0;$$

when $100° \leq \theta \leq 229°$, $$\rho(\theta) = \begin{pmatrix} 0.49336 - 0.00325(\theta - 100) - 4.70431 \times \\ 10^{-6}(\theta - 100)^2 + 2.18207 \times 10^{-7}(\theta - 100)^3 - \\ 7.76735 \times 10^{-10}(\theta - 100)^4 \end{pmatrix} D_0;$$

when $229° \leq \theta \leq 305°$, $\rho(\theta) = 0.25 D_0$;

when $305° \leq \theta \leq 360°$, $$\rho(\theta) = \begin{pmatrix} 0.25 - 8.84562 \times 10^{-6}(\theta - 305) + 2.30409 \times \\ 10^{-6}(\theta - 305)^2 - 8.10513 \times 10^{-7}(\theta - 305)^3 + \\ 2.00086 \times 10^{-3}(\theta - 305)^4 - 1.56195 \times 10^{-10}(\theta - 305)^5 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw;

or, the shape curve of the cross-section of said central screw meets that:

when $0° \leq \theta \leq 23°$, $$\rho(\theta) = \begin{pmatrix} 0.39546 + 0.00436\theta - 0.000328898\theta^2 + \\ 0.00049615\theta^1 - 2.50164 \times 10^{-1}\theta^4 + 5.0823 \times \\ 10^{-11}\theta^2 - 4.85534 \times 10^{-10}\theta^1 \end{pmatrix} D_0;$$

when $23° \leq \theta \leq 145°$, $$\rho(\theta) = \begin{pmatrix} 0.48059 + 0.000898536\,(\theta - 23) - \\ 0.000962297(\theta - 23)^2 + 5.01749 \times 10^{-3} \\ (\theta - 23)^1 - 1.28633 \times 10^{-1}(\theta - 23)^4 + \\ 1.88747 \times 10^{-11}(\theta - 23)^3 - 1.6028 \times \\ 10^{-10}(\theta - 23)^1 + 7.32557 \times 10^{-11}(\theta - 23)^7 - \\ 1.39342 \times 10^{-15}(\theta - 23)^{11} \end{pmatrix} D_0;$$

when $145° \leq \theta \leq 202°$, $$\rho(\theta) = \begin{pmatrix} 0.35035 - 0.000044154(\theta - 145) + 6.21993 \times \\ 10^{-5}(\theta - 145)^2 - 8.31288 \times 10^{-1}(\theta - 145)^1 + 6.56112 \times \\ 10^{-7}(\theta - 145)^4 - 2.23522 \times 10^{-11}(\theta - 145)^3 + 3.57533 \times \\ 10^{-10}(\theta - 145)^1 - 2.18353 \times 10^{-12}(\theta - 145)^7 \end{pmatrix} D_0$$

when $202° \leq \theta \leq 225°$, $$\rho(\theta) = \begin{pmatrix} 0.48074 - 0.00133(\theta - 202) + 0.000542495 \\ (\theta - 202)^2 - 0.00148596(\theta - 202)^1 + 8.56691 \times \\ 10^{-1}(\theta - 202)^4 - 1.51835 \times 10^{-7}(\theta - 202)^3 \end{pmatrix} D_0;$$

when $225° \leq \theta \leq 325°$, $$\rho(\theta) = \begin{pmatrix} 0.34927 - 0.00583(\theta - 225) + 0.000183457 \\ (\theta - 225)^2 - 5.41662 \times 10^{-1}(\theta - 225)^1 + 1.25448 \times \\ 10^{-7}(\theta - 225)^4 - 1.7397 \times 10^{-5}(\theta - 225)^3 + 1.27967 \times \\ 10^{-11}(\theta - 225)^1 - 3.77702 \times 10^{-14}(\theta - 225)^7 \end{pmatrix} D_0;$$

when $325° \leq \theta \leq 351°$, $$\rho(\theta) = \begin{pmatrix} 0.35169 - 0.000591024(\theta - 325) + \\ 0.000116942(\theta - 325)^2 - 8.07623 \times \\ 10^{-1}(\theta - 325)^1 + 3.51208 \times 10^{-7}(\theta - 325)^4 - \\ 5.2224 \times 10^{-9}(\theta - 325)^3 \end{pmatrix} D_0;$$

when $351° \leq \theta \leq 360°$, $$\rho(\theta) = \begin{pmatrix} 0.37187 + 0.00178(\theta - 315) + 0.000238541 \\ (\theta - 351)^2 - 1.61095 \times 10^{-5}(\theta - 351)^1 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw;

the shape of the cross-section of said left screw is the same as the curve shape formed after the cross-section of the right screw is rotated counterclockwise by 180° along the center point of the cylinder groove of the barrel corresponding to the central screw; the shape curve of the cross-section of said right screw meets that:

when $0° \leq \theta° \leq 13°$, $$\rho(\theta) = \begin{pmatrix} 0.49645 + 0.00025651\ 2\theta + 0.00014972\ 5\theta^2 - \\ 2.18392 \times 10^{-5}\theta^3 + 6.8663 \times 10^{-7}\theta^4 \end{pmatrix} D_0;$$

when $13° \leq \theta \leq 119°$, $$\rho(\theta) = \begin{pmatrix} 0.49672 + 0.0016(\theta - 13) - 0.00016043\ 9(\theta - 13)^2 + \\ 3.66195 \times 10^{-6}(\theta - 13)^3 - 4.18633 \times 10^{-8}(\theta - 13)^4 + \\ 2.44243 \times 10^{-10}(\theta - 13)^5 - 5.70929 \times 10^{-13}(\theta - 13)^6 \end{pmatrix} D_0;$$

when $119° \leq \theta \leq 360°$, $$\rho(\theta) = \begin{pmatrix} 0.39857 - 0.00147(\theta - 119) - 2.94068 \times 10^{-5} \\ (\theta - 119)^2 + 6.44036 \times 10^{-7}(\theta - 119)^3 - 4.79428 \times \\ 10^{-9}(\theta - 119)^4 + 1.70193 \times 10^{-11}(\theta - 119)^5 - \\ 2.30605 \times 10^{-14}(\theta - 119)^6 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw;

or, the shape curve of the cross-section of said central screw meets that:

when $0° \leq \theta \leq 27°$, $\rho(\theta) = \begin{pmatrix} 0.28995 + 0.0029\ \theta + 0.00010458\ 6\theta^2 + \\ 1.35828 \times 10^{-6}\theta^3 - 6.80098 \times 10^{-8}\theta^4 + \\ 3.45975 \times 10^{-9}\theta^5 \end{pmatrix} D_0;$ when $27° \leq \theta \leq 36°$, $$\rho(\theta) = \begin{pmatrix} 0.4847 + 0.01065(\theta - 27) - 0.00186(\theta - 27)^2 + \\ 5.1776 \times 10^{-6}(\theta - 27)^3 + 1.23985 \times 10^{-6}(\theta - 27)^4 \end{pmatrix} D_0;$$

when $36° \leq \theta \leq 60°$, $$\rho(\theta) = \begin{pmatrix} 0.4418 - 0.01131(\theta - 36) + 0.00029056\ 3(\theta - 36)^2 - \\ 3.02877 \times 10^{-6}(\theta - 36)^3 - 2.6637 \times 10^{-8}(\theta - 36)^4 \end{pmatrix} D_0;$$

when $60° \leq \theta \leq 120°$, $$\rho(\theta) = \begin{pmatrix} 0.287 - 0.0025(\theta - 60) + 4.57118 \times 10^{-5} \\ (\theta - 60)^2 - 1.90487 \times 10^{-7}(\theta - 60)^3 + 2.28021 \times \\ 10^{-9}(\theta - 60)^4 \end{pmatrix} D_0;$$

when $120° \leq \theta \leq 147°$, $$\rho(\theta) = \begin{pmatrix} 0.28995 + 0.0029(\theta - 120) + 0.00010458\ 6(\theta - 120)^2 + \\ 1.35828 \times 10^{-6}(\theta - 120)^3 - 6.80098 \times 10^{-8}(\theta - 120)^4 + \\ 3.45975 \times 10^{-9}(\theta - 120)^5 \end{pmatrix} D_0;$$

when $147° \leq \theta \leq 156°$, $$\rho(\theta) = \begin{pmatrix} 0.4847 + 0.01065(\theta - 147) - 0.00186(\theta - 147)^2 + 5.1776 \times \\ 10^{-6}(\theta - 147)^3 + 1.23985 \times 10^{-6}(\theta - 147)^4 \end{pmatrix} D_0;$$

when $156° \leq \theta \leq 180°$, $$\rho(\theta) = \begin{pmatrix} 0.4418 - 0.001131(\theta - 156) + 0.00029056\ 3(\theta - 156)^2 - \\ 3.02877 \times 10^{-6}(\theta - 156)^3 - 2.66377 \times 10^{-8}(\theta - 156)^4 \end{pmatrix} D_0;$$

when $180° \leq \theta \leq 240°$, $$\rho(\theta) = \begin{pmatrix} 0.287 - 0.0025(\theta - 180) + 4.57118 \times 10^{-5}(\theta - 180)^2 - \\ 1.90487 \times 10^{-7}(\theta - 180)^3 + 2.28021 \times 10^{-9}(\theta - 180)^4 \end{pmatrix} D_0;$$

when $240° \leq \theta \leq 267°$, $$\rho(\theta) = \begin{pmatrix} 0.28995 + 0.0029(\theta - 240) + 0.00010458\ 6(\theta - 240)^2 + \\ 1.35828 \times 10^{-6}(\theta - 240)^3 - 6.80098 \times 10^{-8}(\theta - 240)^4 + \\ 3.45975 \times 10^{-9}(\theta - 240)^5 \end{pmatrix} D_0;$$

when $267° \leq \theta \leq 270°$, $$\rho(\theta) = \begin{pmatrix} 0.4847 + 0.01065(\theta - 267) - 0.00186(\theta - 267)^2 + \\ 5.1776 \times 10^{-6}(\theta - 267)^3 + 1.23985 \times 10^{-6}(\theta - 267)^4 \end{pmatrix} D_0;$$

when $270° \leq \theta \leq 300°$, $$\rho(\theta) = \begin{pmatrix} 0.4418 - 0.01131(\theta - 270) + 0.00029056\ 3(\theta - 270)^2 - \\ 3.02877 \times 10^{-6}(\theta - 270)^3 - 2.66377 \times 10^{-8}(\theta - 270)^4 \end{pmatrix} D_0;$$

when $300° \leq \theta \leq 360°$, $$\rho(\theta) = \begin{pmatrix} 0.287 - 0.0025(\theta - 180) + 4.57118 \times 10^{-5}(\theta - 180)^2 - \\ 1.90487 \times 10^{-7}(\theta - 180)^3 + 2.28021 \times 10^{-9}(\theta - 180)^4 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw;

the shape of the cross-section of said left screw is the same as the curve shape of the cross-section of said right screw; and the shape curve of the cross-section of said right screw meets that:

when $0° \leq \theta \leq 85°$, $$\rho(\theta) = \begin{pmatrix} 0.32013 + 0.00068520\ 5\theta + 0.00011173\ \theta^2 - \\ 5.88903 \times 10^{-6} + 1.80316 \times 10^{-7}\theta^4 - 3.03623 \times 10^{-9}\theta^5 + \\ 2.64496 \times 10^{-11}\theta^6 - 9.32845 \times 10^{-14}\theta^7 \end{pmatrix} D_0;$$

when $85° \leq \theta \leq 95°$, $$\rho(\theta) = \begin{pmatrix} 0.494681 + 0.00179(\theta - 85) - 0.00047927\ 3(\theta - 85)^2 + \\ 0.00010662(\theta - 85)^3 - 1.63619 \times 10^{-5}(\theta - 85)^4 + \\ 1.24974 \times 10^{-6}(\theta - 85)^5 - 3.77964 \times 10^{-8}(\theta - 85)^6 \end{pmatrix} D_0;$$

when $95° \leq \theta \leq 180°$, $$\rho(\theta) = \begin{pmatrix} 0.494832 - 0.00076124\ 6(\theta - 95) - 0.00012610\ 1(\theta - 95)^2 + \\ 4.25652 \times 10^{-6}(\theta - 95)^3 - 7.13683 \times 10^{-8}(\theta - 95)^4 + 5.9942 \times \\ 10^{-10}(\theta - 95)^5 - 1.98695 \times 10^{-12}(\theta - 95)^6 \end{pmatrix} D_0;$$

when $180° \leq \theta \leq 360°$, $$\rho(\theta) = \begin{pmatrix} 0.31789 - 0.00133(\theta - 180) - 8.60877 \times 10^{-6}(\theta - 180)^2 + \\ 5.0898 \times 10^{-7}(\theta - 180)^3 - 7.16212 \times 10^{-9}(\theta - 180)^4 + \\ 5.3005 \times 10^{-11}(\theta - 180)^5 - 2.05365 \times 10^{-13}(\theta - 180)^6 + \\ 3.64972 \times 10^{-16}(\theta - 180)^7 - 1.76708 \times 10^{-19}(\theta - 180)^8 \end{pmatrix} D_0;$$

wherein, θ is a value corresponding to the polar angle degree, ρ is a polar radius, and $D_0$ is an inner diameter of the cylinder groove of the barrel corresponding to said screw;
or,
the shape curve of the cross-section of said central screw meets that:

when $0° \leq \theta \leq 50°$, $\rho(\theta) = 0.5\ D_0$;
when $50° \leq \theta \leq 90°$, $$\rho(\theta) = \begin{pmatrix} 0.5 - 0.00309(\theta - 50) + 0.00016833\ 1(\theta - 50)^2 - 8.44083 \times \\ 10^{-6}(\theta - 50)^3 + 2.19035 \times 10^{-7}(\theta - 50)^4 - 2.06434 \times 10^{-9}(\theta - 50)^5 \end{pmatrix} D_0;$$

when $90° \leq \theta \leq 101°$, $\rho(\theta) = 0.455\ D_0$;
when $101° \leq \theta \leq 181°$, $$\rho(\theta) = \begin{pmatrix} 0.455 - 0.00143(\theta - 101) - 0.000793059(\theta - 101)^2 + \\ 6.51522 \times 10^{-5}(\theta - 101)^3 - 2.66487 \times 10^{-6}(\theta - 101)^4 + \\ 6.20495 \times 10^{-8}(\theta - 101)^5 - 8.26745 \times 10^{-10}(\theta - 101)^6 + \\ 5.86449 \times 10^{-12}(\theta - 101)^7 - 1.71691 \times 10^{-14}(\theta - 101)^8 \end{pmatrix} D_0;$$

when $181° \leq \theta \leq 193°$, $\rho(\theta) = 0.25\ D_0$;
when $193° \leq \theta \leq 244°$, $$\rho(\theta) = \begin{pmatrix} 0.25 + 0.000361178(\theta - 193) - 0.000107545(\theta - 193)^2 + \\ 0.00002068(\theta - 193)^3 - 1.60164 \times 10^{-6}(\theta - 193)^4 + 6.82867 \times \\ 10^{-8}(\theta - 193)^5 - 1.63573 \times 10^{-9}(\theta - 193)^6 + 2.06803 \times 10^{-11} \\ (\theta - 193)^7 - 1.07375 \times 10^{-13}(\theta - 193)^8 \end{pmatrix} D_0;$$

when $244° \leq \theta \leq 353°$, $$\rho(\theta) = \begin{pmatrix} 0.31875 - 0.00104(\theta - 244) - 3.31524 \times 10^{-5}(\theta - 244)^2 + \\ 4.32237 \times 10^{-6}(\theta - 244)^3 - 1.67102 \times 10^{-7}(\theta - 244)^4 + \\ 3.54572 \times 10^{-9}(\theta - 244)^5 - 4.16652 \times 10^{-11}(\theta - 244)^6 + \\ 2.55218 \times 10^{-13}(\theta - 244)^7 - 6.34643 \times 10^{-16}(\theta - 244)^8 \end{pmatrix} D_0;$$

when $353° \leq \theta \leq 360°$, $\rho(\theta) = 0.5\ D_0$;

wherein, θ is a value corresponding to the polar angle degree, ρ is a polar radius, and $D_0$ is an inner diameter of the cylinder groove of the barrel corresponding to said screw;
the shape of the cross-section of said left screw is the same as the curve shape of the cross-section of said right screw; the shape curve of the cross-section of said right screw meets that:

when $0° \leq \theta \leq 12°$, $\rho(\theta) = 0.5\ D_0$;
when $12° \leq \theta \leq 93°$, $$\rho(\theta) = \begin{pmatrix} 0.5 - 0.00165(\theta - 12) - 0.00013491\ 5(\theta - 12)^2 + \\ 0.00001181\ 4(\theta - 12)^3 - 4.87051 \times 10^{-7}(\theta - 12)^4 + 1.1766 \times \\ 10^{-8}(\theta - 12)^5 - 1.64659 \times 10^{-10}(\theta - 12)^2 + 1.23355 \times 10^{-12} \\ (\theta - 12)^7 - 3.82327 \times 10^{-15}(\theta - 12)^8 \end{pmatrix} D_0;$$

when $93° \leq \theta \leq 173°$, $$\rho(\theta) = \begin{pmatrix} 0.44967 - 0.0012(\theta - 93) - 0.000680386(\theta - 93)^2 + 5.15007 \times \\ 10^{-5}(\theta - 93)^3 - 1.99396 \times 10^{-6}(\theta - 93)^4 + 4.48589 \times 10^{-8} \\ (\theta - 93)^5 - 5.85347 \times 10^{-10}(\theta - 93)^6 + 4.10152 \times 10^{-12}(\theta - 93)^7 - \\ 1.19263 \times 10^{-14}(\theta - 93)^8 \end{pmatrix} D_0;$$

when $173° \leq \theta \leq 230°$, $\rho(\theta) = 0.25\ D_0$;
when $230° \leq \theta \leq 272°$, $$\rho(\theta) = \begin{pmatrix} 0.25 + 0.00057523\ 2(\theta - 230) - 0.00013443\ 3(\theta - 230)^2 + \\ 2.28201 \times 10^{-5}(\theta - 230)^3 - 1.7105 \times 10^{-6}(\theta - 230)^4 + \\ 7.3701 \times 10^{-8}(\theta - 230)^5 - 1.86726 \times 10^{-9}(\theta - 230)^6 + \\ 2.61628 \times 10^{-11}(\theta - 230)^7 - 1.5782 \times 10^{-13}(\theta - 230)^8 \end{pmatrix} D_0;$$

when $272° \leq \theta \leq 283°$, $\rho(\theta) = 0.295\ D_0$;
when $283° \leq \theta \leq 360°$, $$\rho(\theta) = \begin{pmatrix} 0.295 + 0.00013272\ 1(\theta - 293) + 4.58737 \times 10^{-5}(\theta - 283)^2 - \\ 3.34926 \times 10^{-6}(\theta - 283)^3 + 2.15388 \times 10^{-7}(\theta - 283)^4 - \\ 6.89212 \times 10^{-9}(\theta - 283)^5 + 1.18802 \times 10^{-10}(\theta - 283)^6 - 1.04706 \times \\ 10^{-12}(\theta - 283)^7 + 3.70486 \times 10^{-15}(\theta - 283)^8 \end{pmatrix} D_0;$$

wherein, θ is a value corresponding to the polar angle degree, ρ is a polar radius, and $D_0$ is an inner diameter of the cylinder groove of the barrel corresponding to said screw.

As another preferred solution, said lateral screw is only one screw, which is provided on the side of the central screw, and engaged with the central screw; the inner cavity of said barrel is consisted of two cylinder grooves which are communicated, each of the cylinder grooves is fitted with the lateral screw, and the central screw respectively; the central axis distance between the two cylinder grooves is equal to the centerline distance between the central screw and the lateral screw.

With the center points of the cylinder grooves of the barrel corresponding to the central screw and the lateral screw respectively as poles, and the rays elicited horizontally rightwards from the poles as polar axes, the shape curve of the cross-section of said central screw is symmetric with respective to the ray of θ=120° and the ray of θ=240°, and the polar angle is within 0°≤θ≤120°, the corresponding curve meets that:

when $0 \le \theta \le 2°$, $\rho(\theta) = 0.5\ D_0$;

when $2° \le \theta \le 58°$, $$\rho(\theta) = \begin{pmatrix} 0.5 - 0.00243(\theta - 2) + 0.00106(\theta - 2)^2 - 1.67316 \times 10^{-4}(\theta - 2)^3 + \\ 1.08849 \times 10^{-5}(\theta - 2)^4 - 3.74006 \times 10^{-7}(\theta - 2)^5 + 7.15583 \times 10^{-9} \\ (\theta - 2)^6 - 7.21345 \times 10^{-11}(\theta - 2)^7 + 2.98968 \times 10^{-13}(\theta - 2)^8 \end{pmatrix} D_0;$$

when $58° \le \theta \le 62°$, $\rho(\theta) = 0.4\ D_0$;

when $62° \le \theta \le 118°$, $$\rho(\theta) = \begin{pmatrix} 0.4 - 7.16547 \times 10^{-4}(\theta - 62) + 3.66366 \times 10^{-4}(\theta - 62)^2 - \\ 5.72993 \times 10^{-5}(\theta - 62)^3 + 4.76052 \times 10^{-6}(\theta - 62)^4 - \\ 2.09619 \times 10^{-7}(\theta - 62)^5 + 5.0282 \times 10^{-9}(\theta - 62)^6 - \\ 6.18021 \times 10^{-11}(\theta - 62)^7 + 3.03396 \times 10^{-13}(\theta - 62)^8 \end{pmatrix} D_0;$$

when $118° \le \theta \le 120°$, $\rho(\theta) = 0.5\ D_0$ wherein, θ is a value corresponding to the polar angle degree, ρ is a polar radius, and $D_0$ is an inner diameter of the cylinder groove of the barrel corresponding to said screw;

the shape curve of the cross section of said lateral screw is symmetric with respective to the ray of θ=0θ and the ray of θ=180° (ie., the positive direction of the X axis in the orthogonal coordinate system), and the polar angle is within 0°≤θ≤180°, the corresponding curve meets that:

when $0° \le \theta \le 3°$, $\rho(\theta) = 0.4\ D_0$;

when $3° \le \theta \le 87°$, $$\rho(\theta) = \begin{pmatrix} 0.40053 + 1.91042 \times 10^{-4}(\theta - 3) - \\ 5.44854 \times 10^{-5}(\theta - 3)^2 + 5.78786 \times 10^{-6}(\theta - 3)^3 - \\ 2.60181 \times 10^{-7}(\theta - 3)^4 + 6.77081 \times 10^{-9}(\theta - 3)^5 - \\ 1.00659 \times 10^{-10}(\theta - 3)^6 + 7.9546 \times 10^{-13}(\theta - 3)^7 - \\ 2.59711 \times 10^{-15}(\theta - 3)^8 \end{pmatrix} D_0;$$

when $87° \le \theta \le 93°$, $\rho(\theta) = 0.5\ D_0$;

when $93° \le \theta \le 177°$, $$\rho(\theta) = \begin{pmatrix} 0.5 + 5.59592 \times 10^{-4}(\theta - 93) - \\ 3.44997 \times 10^{-4}(\theta - 93)^2 + 1.95669 \times 10^{-5}(\theta - 93)^3 - \\ 6.22514 \times 10^{-7}(\theta - 93)^4 + 1.2176 \times 10^{-8}(\theta - 93)^5 - \\ 1.43316 \times 10^{-10}(\theta - 93)^6 + 9.29081 \times 10^{-13}(\theta - 93)^7 - \\ 2.54457 \times 10^{-15}(\theta - 93)^8 \end{pmatrix} D_0;$$

when $177° \le \theta \le 180°$, $\rho(\theta) = 0.4\ D_0$ wherein, θ is a value corresponding to the polar angle degree, ρ is a polar radius, and $D_0$ is an inner diameter of the cylinder groove of the barrel corresponding to said screw;

or, the shape curve of the cross-section of said central screw is symmetric with respective to the ray of θ=0° and the ray of θ=180°, and the polar angle is within 0°≤θ≤180°, the corresponding curve meets that:

when $0° \le \theta \le 15°$, $\rho(\theta) = 0.5\ D_0$;

when $15° \le \theta \le 69.5°$, $$\rho(\theta) = \begin{pmatrix} 0.5 - 0.00188(\theta - 15) - \\ 8.21227 \times 10^{-4}(\theta - 15)^2 + 8.53313 \times 10^{-5}(\theta - 15)^3 - \\ 4.61141 \times 10^{-6}(\theta - 15)^4 + 1.48589 \times 10^{-7}(\theta - 15)^5 - \\ 2.82368 \times 10^{-9}(\theta - 15)^6 + 2.90967 \times 10^{-11}(\theta - 15)^7 - \\ 1.25091 \times 10^{-13}(\theta - 15)^8 \end{pmatrix} D_0;$$

when $69.5° \le \theta \le 110.5°$, $\rho(\theta) = 0.35714\ D_0$;

when $110.5° \le \theta \le 165°$, $$\rho(\theta) = \begin{pmatrix} 0.35714 + 3.98268 \times 10^{-4}(\theta - 110.5) - \\ 1.91593 \times 10^{-4}(\theta - 110.5)^2 + 3.54059 \times 10^{-5}(\theta - 110.5)^3 - \\ 2.64776 \times 10^{-6}(\theta - 110.5)^4 + 1.08848 \times 10^{-7}(\theta - 110.5)^5 - \\ 2.49656 \times 10^{-9}(\theta - 110.5)^6 + 3.00627 \times 10^{-11}(\theta - 110.5)^7 - \\ 1.48135 \times 10^{-13}(\theta - 110.5)^8 \end{pmatrix} D_0;$$

when $165° \le \theta \le 180°$, $\rho(\theta) = 0.5\ D_0$;

wherein, θ is a value corresponding to the polar angle degree, ρ is a polar radius, and $D_0$ is an inner diameter of the cylinder groove of the barrel corresponding to said screw;

the shape curve of the cross-section of said lateral screw is symmetric with respective to the ray of θ=0° and the ray of θ=180°, and the polar angle is within 0°≤θ≤180°, the corresponding curve meets that:

when $0° \le \theta \le 41°$, $\rho(\theta) = 0.5\ D_0$;

when $41° \le \theta \le 150°$, $$\rho(\theta) = \begin{pmatrix} 0.5 + 5.80648 \times 10^{-4}(\theta - 41) - \\ 1.0674 \times 10^{-4}(\theta - 41)^2 - 4.94415 \times 10^{-7}(\theta - 41)^3 \\ 1.14699 \times 10^{-7}(\theta - 41)^4 - 2.86057 \times 10^{-9}(\theta - 41)^5 \\ 3.31268 \times 10^{-11}(\theta - 41)^6 - 1.89458 \times 10^{-13}(\theta - 41)^7 \\ 4.31702 \times 10^{-16}(\theta - 41)^8 \end{pmatrix} D_0;$$

when $150° \le \theta \le 180°$, $\rho(\theta) = 0.35714\ D_0$;

wherein, $\theta$ is a value corresponding to the polar angle degree, $\rho$ is a polar radius, and $D_0$ is an inner diameter of the cylinder groove of the barrel corresponding to said screw;

or, the shape curve of the cross-section of said central screw is symmetric with respective to the ray of $\theta=120°$ and the ray of $\theta=240°$, and the polar angle is within $0°\le\theta\le120°$, the corresponding curve meets that:

when $0° \le \theta \le 10°$, $\rho(\theta) = 0.5\ D_0$;

when $10° \le \theta \le 58°$, $$\rho(\theta) = \begin{pmatrix} 0.5 - 0.00831(\theta - 10) + \\ 2.69315 \times 10^{-4}(\theta - 10)^2 - 2.05095 \times 10^{-5}(\theta - 10)^3 + \\ 1.59416 \times 10^{-6}(\theta - 10)^4 - 6.95534 \times 10^{-8}(\theta - 10)^5 + \\ 1.65362 \times 10^{-9}(\theta - 10)^6 - 2.02237 \times 10^{-11}(\theta - 10)^7 + \\ 9.97816 \times 10^{-14}(\theta - 10)^8 \end{pmatrix} D_0;$$

when $58° \le \theta \le 62°$, $\rho(\theta) = 0.357143\ D_0$ when $62° \le \theta \le 110°$, $$\rho(\theta) = \begin{pmatrix} 0.35714 - 4.90697 \times 10^{-5}(\theta - 62) + 1.02434 \times 10^{-5}(\theta - 62)^2 \\ 1.22629 \times 10^{-6}(\theta - 62)^3 1.76059 \times 10^{-7}(\theta - 62)^4 - \\ 1.56233 \times 10^{-8}(\theta - 62)^5 + 5.21936 \times 10^{-10}(\theta - 62)^6 - \\ 7.85637 \times 10^{-12}(\theta - 62)^7 + 4.47471 \times 10^{-14}(\theta - 62)^8 \end{pmatrix} D_0;$$

when $110° \le \theta \le 120°$, $\rho(\theta) = 0.5\ D_0$.

wherein, $\theta$ is a value corresponding to the polar angle degree, $\rho$ is a polar radius, and $D_0$ is an inner diameter of the cylinder groove of the barrel corresponding to said screw;

the shape curve of the cross-section of said lateral screw is symmetric with respective to the ray of $\theta=0°$ and the ray of $\theta=180°$, and the polar angle is within $0°\le\theta\le180°$, the corresponding curve meets that:

when $0° \le \theta \le 30°$, $\rho(\theta) = 0.35714\ D_0$;

when $30° \le \theta \le 174°$, $$\rho(\theta) = \begin{pmatrix} 0.35714 - 1.2981 \times 10^{-4}(\theta - 30) + 4.15281 \times 10^{-5}(\theta - 30)^2 - \\ 2.15177 \times 10^{-6}(\theta - 30)^3 + 6.69687 \times 10^{-8}(\theta - 30)^4 - \\ 1.10347 \times 10^{-9}(\theta - 30)^5 + 9.90148 \times 10^{-12}(\theta - 30)^6 - \\ 4.55739 \times 10^{-14}(\theta - 30)^7 + 8.37526 \times 10^{-17}(\theta - 30)^8 \end{pmatrix} D_0;$$

when $174° \le \theta \le 180°$, $\rho(\theta) = 0.5\ D_0$.

wherein, $\theta$ is a value corresponding to the polar angle degree, $\rho$ is a polar radius, and $D_0$ is an inner diameter of the cylinder groove of the barrel corresponding to said screw;

or, the shape curve of the cross-section of said central screw is symmetric with respective to the ray of $\theta=0°$, the ray of $\theta=90°$, and the ray of $\theta=270°$, and the polar angle is within $0°\le\theta\le90°$, the corresponding curve meets that:

when $0° \le \theta \le 3°$, $\rho(\theta) = 0.5\ D_0$;

when $3° \le \theta \le 87°$, $$\rho(\theta) = \begin{pmatrix} 0.5 - 0.00776(\theta - 3) + \\ 3.35014 \times 10^{-5}(\theta - 3)^2 + 8.68488 \times 10^{-6}(\theta - 3)^3 - \\ 3.48947 \times 10^{-7}(\theta - 3)^4 + 6.34905 \times 10^{-9}(\theta - 3)^5 - \\ 5.62555 \times 10^{11}(\theta - 3)^6 + 1.98268 \times 10^{-13}(\theta - 3)^7 \end{pmatrix} D_0;$$

when $87° \le \theta \le 90°$, $\rho(\theta) = 0.5\ D_0$.

wherein, $\theta$ is a value corresponding to the polar angle degree, $\rho$ is a polar radius, and $D_0$ is an inner diameter of the cylinder groove of the barrel corresponding to said screw;

the shape curve of the cross-section of said lateral screw is symmetric with respective to the ray of $\theta=0°$ and the ray of $\theta=180°$, and the polar angle is within $0°\le\theta\le180°$, the corresponding curve meets that:

when $0° \le \theta \le 12°$, $\rho(\theta) = 0.35714\ D_0$;

when $12° \le \theta \le 180°$, $$\rho(\theta) = \begin{pmatrix} 0.35714 + 1.16393 \times 10^{-4}(\theta - 12) + \\ 1.09189 \times 10^{-6}(\theta - 12)^2 + 1.02469 \times 10^{-7}(\theta - 12)^3 - \\ 7.39494 \times 10^{-10}(\theta - 12)^4 - 2.22006 \times 10^{-12}(\theta - 12)^5 \\ 5.1641 \times 10^{-14}(\theta - 12)^6 - 1.7693 \times 10^{-16}(\theta - 12)^7 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw;

or, the shape curve of the cross-section of said central screw is symmetric with respective to the ray of $\theta=0°$, the ray of $\theta=72°$, the ray of $\theta=144°$, the ray of $\theta=216°$, and the ray of $\theta=288°$, and the polar angle is within $0°\le\theta\le72°$, the corresponding curve meets that:

when $0° \leq \theta \leq 4°$, $\rho(\theta) = 0.5\ D_0$;

when $4° \leq \theta \leq 34°$, $$\rho(\theta) = \begin{pmatrix} 0.5 - 0.02464(\theta - 4) + \\ 0.00617(\theta - 4)^2 - 9.00044 \times 10^{-4}(\theta - 4)^3 + \\ 7.03593 \times 10^{-5}(\theta - 4)^4 - 2.98822 \times 10^{-6}(\theta - 4)^5 + \\ 6.51822 \times 10^{-8}(\theta - 4)^6 - 5.71897 \times 10^{-10}(\theta - 4)^7 \end{pmatrix} D_0;$$

when $34° \leq \theta \leq 38°$, $\rho(\theta) = 0.4\ D_0$;

when $38° \leq \theta \leq 68°$, $$\rho(\theta) = \begin{pmatrix} 0.4 + 2.66133 \times 10^{-4}(\theta - 38) - \\ 4.49843 \times 10^{-5}(\theta - 38)^2 + 3.42164 \times 10^{-5}(\theta - 38)^3 - \\ 4.56139 \times 10^{-6}(\theta - 38)^4 + 3.02712 \times 10^{-7}(\theta - 38)^5 - \\ 9.6014 \times 10^{-9}(\theta - 38)^6 + 1.16449 \times 10^{-10}(\theta - 38)^7 \end{pmatrix} D_0;$$

when $68° \leq \theta \leq 72°$, $\rho(\theta) = 0.5\ D_0$;

wherein, θ is a value corresponding to the polar angle degree, ρ is a polar radius, and $D_0$ is an inner diameter of the cylinder groove of the barrel corresponding to said screw;

the shape curve of the cross-section of said lateral screw is symmetric with respective to the ray of θ=0° and the ray of θ=180°, and the polar angle is within 0°≤θ≤180°, the corresponding curve meets that:

when $0° \leq \theta \leq 20°$, $\rho(\theta) = 0.4\ D_0$;

when $20° \leq \theta \leq 170°$, $$\rho(\theta) = \begin{pmatrix} 0.4 + 4.16738 \times 10^{-4}(\theta - 20) - \\ 1.72721 \times 10^{-5}(\theta - 20)^2 + 7.47552 \times 10^{-7}(\theta - 20)^3 - \\ 1.38142 \times 10^{-8}(\theta - 20)^4 + 1.46263 \times 10^{-10}(\theta - 20)^5 - \\ 9.05881 \times 10^{-13}(\theta - 20)^6 + 3.10626 \times 10^{-15}(\theta - 20)^7 - \\ 4.67939 \times 10^{-18}(\theta - 20)^8 \end{pmatrix} D_0;$$

when $170° \leq \theta \leq 180°$, $\rho(\theta) = 0.5\ D_0$;

wherein, θ is a value corresponding to the polar angle degree, ρ is a polar radius, and $D_0$ is an inner diameter of the cylinder groove of the barrel corresponding to said screw.

The working principle of the above-mentioned apparatus is that: the main electric motor drives the toothed gearing mechanism, the toothed gearing mechanism drives the central screw and the two lateral screws to co-rotate around the respective axes, the rotation speeds of the central screw and the two lateral screws are the same or different, and the rotation speeds of the two lateral screws are the same. The materials enter the barrel from the feeding port, and move towards the discharging port direction under the forced transportation of the screw mechanism, at this time the solids are subjected to an asymmetric effect generated by a periodical plasticizing and extruding space generated by the rotations of the central screw and the lateral screws and an interwiping effect between the central screw and the two lateral screws, so that the heat exchanging efficiencies between the melts and the surface of the solid materials are increased, the solid materials themselves are also participated into the stirring process, and dispersed into the melts to carry out a strong convection, so as to generate dispersion and melting, and becoming melts; the melts enter the venting zone, the space consists of the central screw and the lateral screws and the inner cavity of the barrel is suddenly enlarged, the materials are continuously stirred by the rotation of the central screw and the two lateral screws so that the gases are discharged from the venting port; the melts enter the compounding and extruding zone, the melts proceed under the periodical asymmetric space effect generated by the rotation of the central screw and the two lateral screws, the interfaces are facilitated to reorientate and regenerate continuously, the materials are compounded and plasticized, and a self-cleaning effect is achieved by the interwiping effect between the central screw and the two lateral screws, so that the melts are stably extruded from the discharging port.

The self-cleaning plasticizing venting and extruding method by co-rotating non-twin multi-screws carried out by the above-mentioned apparatus, particularly, comprises the steps of:

(1) after the materials enter the barrel from the feeding port, the central screw and the lateral screws co-rotate along the axis of the respective screws under the drive of the driving mechanism; when the materials enter the solid transporting zone, the feed materials transportation is carried out under the co-effects of the axial transporting forces from the central screw and the lateral screws and the friction forces from the central screw and the lateral screws, so that the materials are forced to move towards the discharging port direction, at the same time the gases in the materials are discharged from the feeding port as the materials are heated;

(2) when the materials move to the melting zone, the central screw and the lateral screws rotate in a relatively engaging way so as to generate a periodical transport space for transporting the materials; the materials are melt under the co-effects of the friction heat generated by the high speed rotation of each of the screws and at the same time the external heat on the barrel; and the melting process is accelerated under the interwiping effect between the central screw and the lateral screws and the asymmetrical effect of the transport space, so that the materials become melts;

(3) when the melts enter the venting zone, the space consisted of the central screw and the lateral screws and the inner cavity of the barrel is suddenly enlarged, the materials are continuously stirred by the rotation of the central screw and the lateral screws, so that the gases are discharged from the venting port, and the melts move further towards the discharging port direction; and (4) when the melts enter the compounding and extruding zone, the melts proceed under the periodical space effect generated by the rotation of the central screw and the lateral screws, the interfaces are facilitated to reorientate and regenerate continuously by the interwiping effect between the central screw and the lateral screws and the asymmetrical effect of the transport space, the materials are compounded and plasticized, at the same time a self-cleaning effect are achieved by the interwiping effect between each of the screws, so that the melts are stably extruded from the discharging port.

The rotation speeds of said two lateral screws are the same, and the rotation speed ratio between each of the lateral screws and the central screw is 0.1-6.0.

The present invention has the following advantages and beneficial effects as follow as compared with the prior art:

1. the present invention uses a central screw and two identical-shaped lateral screws to increase the solid transporting efficiency, so that it can increase the extruding yield in a higher extent, and is suitable for a large-scale production;

2. the shapes of the central screw and the lateral screws in the present invention are different, and the positions of the two lateral screws can be provided with a certain phase angle difference, so that there is an asymmetric (unconsistency) in the flow space for the materials, the compounding and heat transferring processes are enhanced, so that the heat and mechanical courses for carrying out the plasticization are greatly abbreviated, the energy consumption is low, and the effects for saving energy and reducing consumption are significant;

3. the present invention uses an interwiping effect between the central screw and the two lateral screws to carry out a self-cleaning effect during the processing process, and the residence time during the processing process has a narrow distribution, so as to improve the processing efficiency and effectiveness;

4. each of the screws in the present invention uses a non-uniform geometrical shape, under the geometrical shape effect and the interwiping effect between each of the screws, the mixing and compounding intensity and effect are overall enhanced, and the dispersing distribution and mixing effects are extremely excellent, so that it is especially suitable for processing nano-materials in high yield; and 5. the materials are transported by the cooperative rotation between the central screw and the two lateral screws in the present invention, so that an uniform interface extension can be achieved, an uniform material transportation can be achieved, and the uniformity for controlling the phase structures is good.

DESCRIPTION OF ACCOMPANYING DRAWINGS

PARTICULAR EMBODIMENTS

The present invention is further described in detail below by incorporating the embodiments and drawings, but the embodiments of the present invention are not limited thereto.

Embodiment 1

Figure 1:
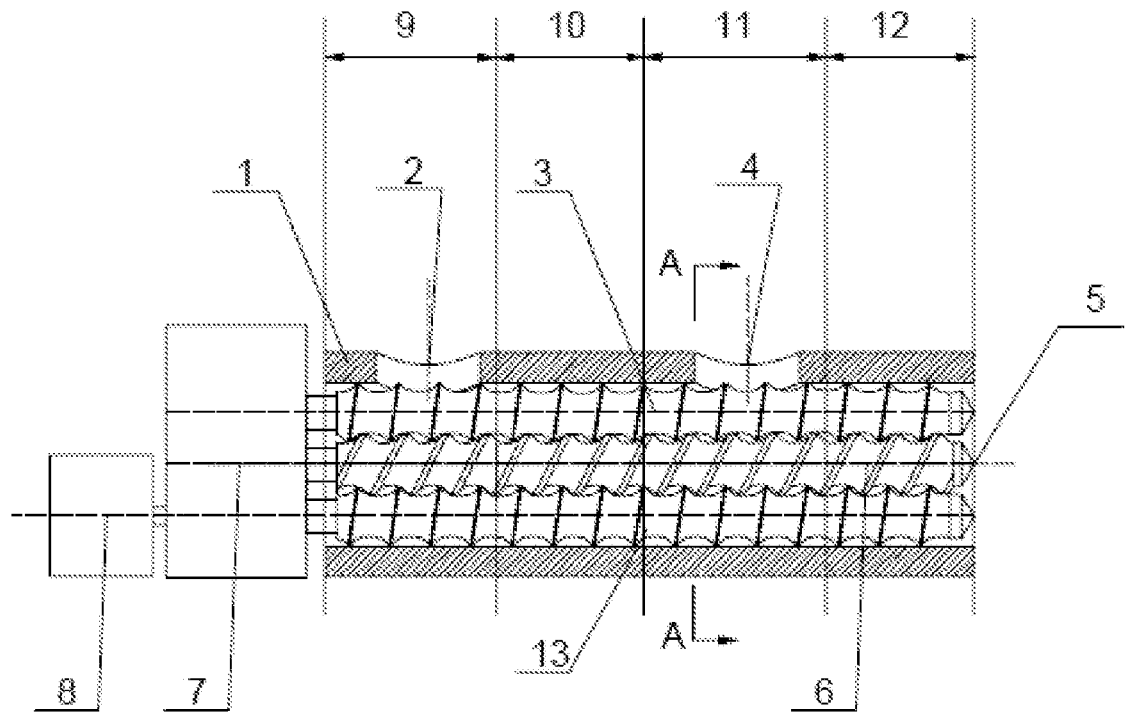
FIG. 1 is a structural schematic diagram of embodiment 1 in the present invention.

As shown in FIG. 1, the self-cleaning plasticizing venting and extruding apparatus by co-rotating non-twin multi-screws comprises a screw mechanism, a barrel 1, a feeding port 2, a venting port 4, a discharging port 5, and a driving mechanism, wherein said driving mechanism is provided at the ends of the barrel 1 respectively, and is connected to the screw mechanism; said screw mechanism is provided inside the barrel 1, and placed horizontally, and the inner section of the barrel 1 are divided into a solid transporting zone 9, a melting zone 10, a venting zone 11 and a compounding and extruding zone 12; said feeding port 2 is provided above the barrel 1 of the solid transporting zone 9, said venting port 4 is provided above the barrel 1 of the venting zone 11, both the feeding port 2 and the venting port 4 are communicated with the barrel 1; said discharging port 5 is provided at the end of the barrel 1, said screw mechanism comprises a central screw 6 and two uniform shaped lateral screws, the axis of the central screw 6 is coincided with that of the barrel 1, the two lateral screws are left screw 3 and right screw 13 respectively, provided on both sides of the central screw 6 respectively, and engaged with the central screw 6; and the contour lines of the threads of said central screw 6 and said lateral screws are tangent to the inner wall of the barrel 1; said driving mechanism is connected to the central screw 6 and the lateral screws respectively.

Said driving mechanism comprises a main electric motor 8 and a toothed gearing mechanism 7 which are interconnected with each other, said toothed gearing mechanism 7 is connected to the central screw 6 and the two lateral screws respectively.

The inner cavity of said barrel 1 is consisted of three cylinder grooves which have the same inner diameter and are communicated with each other, each of the cylinder grooves is fitted with the left screw 3, the central screw 6 and the right screw 13 respectively; the central axis distances from the cylinder grooves on both sides to the cylinder groove at the central position are equal to the centerline distances from the central screw 6 to the left screw 3 and the right screw 13.

The peak angle of the screw ridge of said central screw 6 is 38°.

Figure 2:
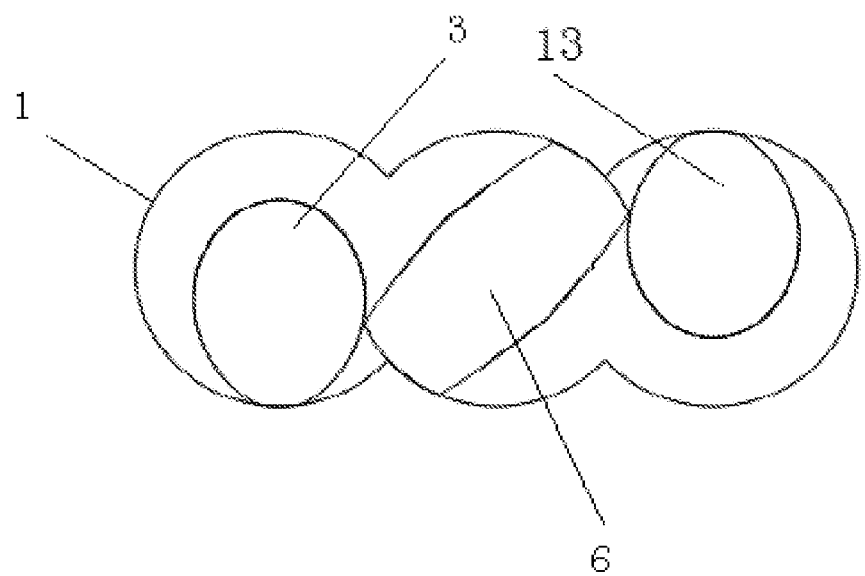
FIG. 2 is an enlarged structural schematic diagram of embodiment 1 cutting along A-A shown in FIG. 1.

As shown in FIG. 2, the phase angle difference between the positions of said left screw 3 and right screw 13 is 180°, ie., the cross-section shape of said left screw 3 is the same as the curve shape formed after the cross-section of the right screw 13 is rotated counterclockwise by 180° along the center point of the cylinder groove of the barrel corresponding to the central screw (ie., the shape of the cross-section of said left screw is the same as the curve shape of the cross-section formed after the right screw is rotated counterclockwise by 180° along the center point of the cylinder groove of the barrel corresponding to the central screw);

with the center points of the cylinder grooves of the barrel corresponding to the central screw 6 and each of the lateral screws respectively as poles, and the rays elicited horizontally rightwards from the poles (ie., in the orthogonal coordinate system, the rays in the positive direction of X axis of the connecting line through the center points of the cylinder grooves of the barrel) as polar axes, the shape curve of the cross-section of said central screw 6 meets that:

when $0° \leq \theta \leq 25°$, $$\rho(\theta) = \begin{pmatrix} 0.32256 + 0.00392\theta + 0.000309497\theta^2 - 2.57326 \times 10^{-5}\theta^2 + \\ 9.28644 \times 10^{-7}\theta^4 + 1.8713 \times 10^{-11}\theta^3 - 8.12786 \times 10^{-10}\theta^1 - \\ 9.61005 \times 10^{-12}\theta^7 \end{pmatrix} D_0;$$

-continued when $25° \leq \theta \leq 63°$, $\rho(\theta) = 0.5\ D_0$;

when $63° \leq \theta \leq 123°$, $$\rho(\theta) = \begin{pmatrix} 0.5 + 0.000823585(\theta-63) - 0.00134(\theta-63)^2 + \\ 8.00734 \times 10^{-2}(\theta-63)^2 - 2.14653 \times 10^{-1}(\theta-63)^4 + \\ 2.76223 \times 10^{-11}(\theta-63)^2 - 1.37762 \times 10^{-10}(\theta-63)^1 \end{pmatrix} D_0;$$

when $123° \leq \theta \leq 147°$, $$\rho(\theta) = \begin{pmatrix} 0.25391 - 0.00207(\theta-123) + 0.000573645(\theta-123)^2 - \\ 8.45874 \times 10^{-3}(\theta-123)^2 + 6.53416 \times 10^{-1}(\theta-123)^4 - \\ 2.56256 \times 10^{-7}(\theta-123)^3 + 4.47098 \times 10^{-5}(\theta-123)^1 - \\ 2.03618 \times 10^{-11}(\theta-123)^7 \end{pmatrix} D_0;$$

when $147° \leq \theta \leq 205°$, $\rho(\theta) =$ $$\begin{pmatrix} 0.25374 + 0.000730048(\theta-147) - 0.000156535(\theta-147)^2 + \\ 3.73081 \times 10^{-5}(\theta-147)^3 - 3.07839 \times 10^{-6}(\theta-147)^4 + \\ 1.32913 \times 10^{-7}(\theta-147)^5 - 3.10949 \times 10^{-9}(\theta-147)^6 + \\ 3.74465 \times 10^{-11}(\theta-147)^7 - 1.81606 \times 10^{-13}(\theta-147)^8 \end{pmatrix} D_0;$$

when $205° \leq \theta \leq 243°$, $\rho(\theta) = 0.5\ D_0$;

when $243° \leq \theta \leq 307°$, $$\rho(\theta) = \begin{pmatrix} 0.5 + 0.00369(\theta-243) - 0.00226(\theta-243)^2 + \\ 0.000184965(\theta-243)^3 - 7.94221 \times 10^{-6}(\theta-243)^4 + \\ 2.00615 \times 10^{-7}(\theta-243)^5 - 2.9807 \times 10^{-9}(\theta-243)^6 + \\ 2.4097 \times 10^{-11}(\theta-243)^7 - 8.17763 \times 10^{-14}(\theta-243)^8 \end{pmatrix} D_0;$$

when $307° \leq \theta \leq 323°$, $$\rho(\theta) = \begin{pmatrix} 0.2568 - 0.00882(\theta-307) + 0.00414(\theta-307)^2 - \\ 0.000908651(\theta-307)^3 + 0.000100777(\theta-307)^4 - \\ 5.50309 \times 10^{-6}(\theta-307)^5 + .20454 \times 10^{-7}(\theta-307)^6 - \\ 11.95559 \times 10^{-10}(\theta-307)^7 \end{pmatrix} D_0;$$

when $307° \leq \theta \leq 323°$, $$\rho(\theta) = \begin{pmatrix} 0.2568 - 0.00882(\theta-307) + 0.00414(\theta-307)^2 - \\ 0.000908651(\theta-307)^3 + 0.000100777(\theta-307)^4 - \\ 5.50309 \times 10^{-6}(\theta-307)^5 + 1.20454 \times 10^{-7}(\theta-307)^6 - \\ 1.95559 \times 10^{-10}(\theta-307)^7 \end{pmatrix} D_0;$$

when $323° \leq \theta \leq 360°$, $\rho(\theta) =$ $$\begin{pmatrix} 0.25618 + 0.00082668(\theta-323) - 0.000319894(\theta-323)^2 + \\ 4.17742 \times 10^{-5}(\theta-323)^3 - 2.08266 \times 10^{-6}(\theta-323)^4 + \\ 4.80871 \times 10^{-8}(\theta-323)^5 - 4.18424 \times 10^{-10}(\theta-323)^6 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw;

the shape curve of the cross-section of said right screw 13 meets that:

when $0° \leq \theta \leq 80°$, $$\rho(\theta) = \begin{pmatrix} 0.28446 + 0.001730\theta - 4.07776 \times 10^{-6}\theta^2 + \\ 4.49932 \times 10^{-7}\theta^3 - 3.26681 \times 10^{-9}\theta^4 \end{pmatrix} D_0;$$

when $80° \leq \theta \leq 100°$, $$\rho(\theta) = \begin{pmatrix} 0.49331 + 0.00156(\theta-80) + 3.82324 \times 10^{-5}(\theta-80)^2 - \\ 4.32369 \times 10^{-5}(\theta-80)^3 + 5.05212 \times 10^{-6}(\theta-80)^4 - \\ 2.3955 \times 10^{-7}(\theta-80)^5 + 4.02621 \times 10^{-9}(\theta-80)^6 \end{pmatrix} D_0;$$

when $100° \leq \theta \leq 229°$, $\rho(\theta) =$ $$\begin{pmatrix} 0.49336 - 0.00325(\theta-100) - 4.70431 \times 10^{-6}(\theta-100)^2 + \\ 2.18207 \times 10^{-7}(\theta-100)^3 - 7.76735 \times 10^{-10}(\theta-100)^4 \end{pmatrix} D_0;$$

when $229° \leq \theta \leq 305°$, $\rho(\theta) = 0.25\ D_0$;

when $305° \leq \theta \leq 360°$, $\rho(\theta) =$ $$\begin{pmatrix} 0.25 - 8.84562 \times 10^{-5}(\theta-305) + 2.30409 \times 10^{-5}(\theta-305)^2 - \\ 8.10513 \times 10^{-7}(\theta-305)^3 + 2.00086 \times 10^{-8}(\theta-305)^4 - \\ 1.56195 \times 10^{-10}(\theta-305)^5 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw; and the screw compression ratio between the central screw 6 and the two lateral screws is in a range of 1-10.

A self-cleaning plasticizing venting and extruding process by co-rotating non-twin multi-screws carried out by the above-mentioned apparatus, characterized by particularly comprising the steps of:

(1) after the materials enter the barrel 1 from the feeding port 2, the central screw 6 and the two lateral screws co-rotate along the respective screw axis under the drive of the driving mechanism; when the materials enter the solid transporting zone 9, the feed materials are transported under the co-effects of the axial transporting force from the central screw 6 and the two lateral screws and the friction force from the central screw 6 and the two lateral screws, so that the materials are forced to move towards the discharging port 5 direction, at the same time the gases in the materials are discharged from the feeding port 2 as the materials are heated;

(2) when the materials move to the melting zone 10, the central screw 6 and the two lateral screws rotate in a relatively engagement mode so as to generate a periodical transport space for transporting the materials; the materials are melt under the co-effects of the friction heat generated from the high speed rotation of each of the screws and at the same time the external heat on the barrel 1; and the melting process is accelerated under the interwiping effect between the central screw 6 and the two lateral screws and the asymmetrical effect of the transport space, so that the materials become melts;

(3) when the melts enter the venting zone 11, the space consisted of the central screw 6 and the lateral screws and the inner cavity of the barrel 1 is suddenly enlarged, the materials are continuously stirred by the rotation of the central screw 6 and the two lateral screws, so that the gases are discharged from the venting port 4, and the melts move further towards the discharging port 5 direction;

(4) when the melts enter the compounding and extruding zone 12, the melts proceed under the periodical space effect generated by the rotation of the central screw 6 and the two lateral screws, the interfaces are facilitated to reorientate and regenerate continuously under the interwiping effect between the central screw 6 and the two lateral screws and the asymmetrical effect of the transport space, the materials are compounded and plasticized, and at the same time a self-cleaning effect is carried out by the interwiping effect between each of the screws, so that the melts are stably extruded from the discharging port 5; and (5) the rotation speeds of said two lateral screws are the same, and the rotation speed ratio between each of the lateral screws and the central screw 6 is 2.0.

Embodiment 2

Figure 3:
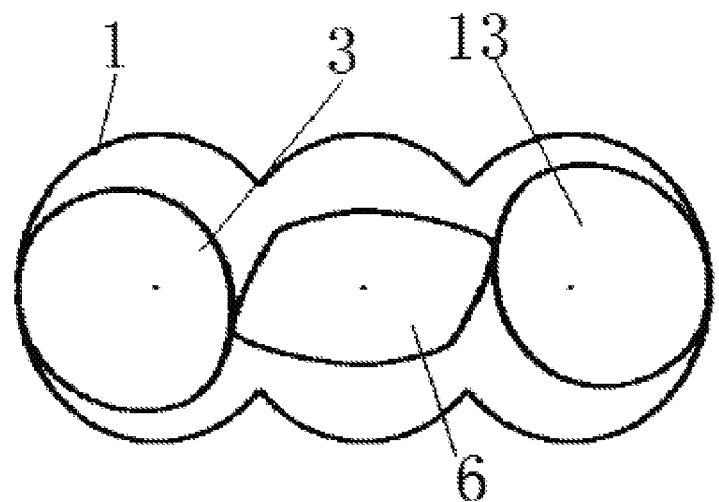
FIG. 3 is an enlarged structural schematic diagram of embodiment 2 cutting along A-A shown in FIG. 1.

The present embodiment has the same structure as that in embodiment 1, except the following features: as shown in FIG. 3, the phase angle difference between the positions of said left screw 3 and right screw 13 is 180°, ie., the shape of the cross-section of said left screw 3 is the same as the curve shape formed after the cross-section of the right screw 13 is rotated counterclockwise by 180° along the center point of the cylinder groove of the barrel corresponding to the central screw. With the center points of the cylinder grooves of the barrel corresponding to the central screw 6 and each of the lateral screws respectively as poles, and the rays elicited horizontally rightwards from the poles (ie., in the orthogonal coordinate system, the rays in the positive direction of X axis of the connecting line through the center points of the cylinder grooves of the barrel) as polar axes, the shape curve of the cross-section of said central screw 6 meets that:

when $0° \leq \theta \leq 23°$, $$\rho(\theta) = \begin{pmatrix} 0.39546 + 0.004436\theta - 0.000328898\theta^2 + 0.0000496150\theta^3 - \\ 2.50164 \times 10^{-6}\theta^4 + 5.0823 \times 10^{-8}\theta^5 - 4.85534 \times 10^{-10}\theta^6 \end{pmatrix} D_0;$$

when $23° \leq \theta \leq 145°$, $$\rho(\theta) = \begin{pmatrix} 0.48059 + 0.000898536(\theta - 23) - 0.000962297(\theta - 23)^2 + \\ 5.01749 \times 10^{-5}(\theta - 23)^3 - 1.28633 \times 10^{-6}(\theta - 23)^4 + \\ 1.88747 \times 10^{-8}(\theta - 23)^5 - 1.6028 \times 10^{-10}(\theta - 23)^6 + \\ 7.32557 \times 10^{-13}(\theta - 23)^7 - 1.39342 \times 10^{-15}(\theta - 23)^8 \end{pmatrix} D_0;$$

when $145° \leq \theta \leq 202°$, $$\rho(\theta) = \begin{pmatrix} 0.35035 - 0.0000441 54(\theta - 145) + 6.21993 \times 10^{-5}(\theta - 145)^2 - \\ 8.31288 \times 10^{-6}(\theta - 145)^3 + 6.56112 \times 10^{-7}(\theta - 145)^4 - \\ 2.23522 \times 10^{-8}(\theta - 145)^5 + 3.57533 \times 10^{-10}(\theta - 145)^6 - \\ 2.18353 \times 10^{-12}(\theta - 145)^7 \end{pmatrix} D_0;$$

when $202° \leq \theta \leq 225°$, $$\rho(\theta) = \begin{pmatrix} 0.48074 - 0.00133(\theta - 202) + 0.000542495(\theta - 202)^2 - \\ 0.000148596(\theta - 202)^3 + 8.56691 \times 10^{-6}(\theta - 202)^4 - \\ 1.51835 \times 10^{-7}(\theta - 202)^5 \end{pmatrix} D_0;$$

when $225° \leq \theta \leq 325°$, $$\rho(\theta) = \begin{pmatrix} 0.34927 - 0.00583(\theta - 225) + 0.000183457(\theta - 225)^2 - \\ 5.41662 \times 10^{-6}(\theta - 225)^2 + 1.25448 \times 10^{-7}(\theta - 225)^4 - \\ 1.7397 \times 10^{-9}(\theta - 225)^5 + 1.27967 \times 10^{-11}(\theta - 225)^6 - \\ 3.77702 \times 10^{-14}(\theta - 225)^7 \end{pmatrix} D_0;$$

when $325° \leq \theta \leq 351°$, $$\rho(\theta) = \begin{pmatrix} 0.35169 - 0.000591024(\theta - 325) + 0.000116942(\theta - 325)^2 - \\ 8.07623 \times 10^{-6}(\theta - 325)^3 + 3.51208 \times 10^{-7}(\theta - 325)^4 - \\ 5.2224 \times 10^{-9}(\theta - 325)^5 \end{pmatrix} D_0;$$

when $351° \leq \theta \leq 360°$, $$\rho(\theta) = \begin{pmatrix} 0.37187 + 0.00178(\theta - 351) + 0.000238541(\theta - 351)^2 - \\ 1.61095 \times 10^{-5}(\theta - 351)^3 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw; the shape curve of the cross-section of said right screw 13 meets that:

when $0° \leq \theta \leq 13°$, $$\rho(\theta) = \begin{pmatrix} 0.49645 + 0.000256512\theta + 0.000149725\theta^2 - \\ 2.18392 \times 10^{-5}\theta^3 + 6.8663 \times 10^{-7}\theta^4 \end{pmatrix} D_0;$$

when $13° \leq \theta \leq 119°$, $$\rho(\theta) = \begin{pmatrix} 0.49672 + 0.0016(\theta - 13) - 0.000160439(\theta - 13)^2 + \\ 3.66195 \times 10^{-6}(\theta - 13)^3 - 4.18633 \times 10^{-8}(\theta - 13)^4 + \\ 2.44243 \times 10^{-10}(\theta - 13)^5 - 5.70929 \times 10^{-13}(\theta - 13)^6 \end{pmatrix} D_0;$$

when $119° \leq \theta \leq 360°$, $$\rho(\theta) = \begin{pmatrix} 0.39857 - 0.00147(\theta - 119) - 2.94068 \times 10^{-5}(\theta - 119)^2 + \\ 6.44036 \times 10^{-7}(\theta - 119)^3 - 4.79428 \times 10^{-9}(\theta - 119)^4 + \\ 1.70193 \times 10^{-11}(\theta - 119)^5 - 2.30605 \times 10^{-14}(\theta - 119)^6 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw; and the rotation speeds of said two lateral screws are the same, and the rotation speed ratio between each of the lateral screws and the central screw 6 is 2.

Embodiment 3

Figure 4:
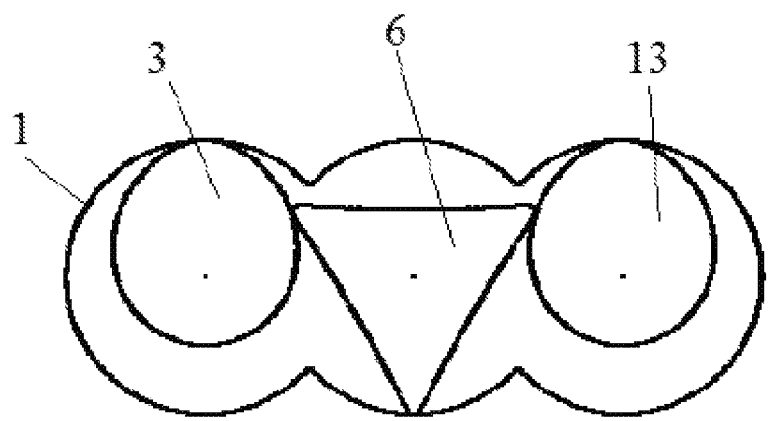
FIG. 4 is an enlarged structural schematic diagram of embodiment 3 cutting along A-A shown in FIG. 1.

The present embodiment has the same structure as that in embodiment 1, except the following features: as shown in FIG. 4, the phase angle difference between the positions of said left screw 3 and right screw 13 is 0°, ie., the shape of the cross-section of said left screw 3 is the same as the curve shape of the cross-section of the right screw 13; with the center points of the cylinder grooves of the barrel corresponding to the central screw 6 and each of the lateral screws respectively as poles, and the rays elicited horizontally rightwards from the poles (ie., in the orthogonal coordinate system, the rays in the positive direction of X axis of the connecting line through the center points of the cylinder grooves of the barrel) as polar axes, the shape curve of the cross section of said central screw 6 meets that:

when $0° \leq \theta \leq 27°$, $$\rho(\theta) = \begin{pmatrix} 0.28995 + 0.0029\theta + 0.000104586\theta^2 + 1.35828 \times 10^{-6}\theta^3 - \\ 6.80098 \times 10^{-8}\theta^4 + 3.45975 \times 10^{-9}\theta^5 \end{pmatrix} D_0;$$

when $27° \leq \theta \leq 36°$, $$\rho(\theta) = \begin{pmatrix} 0.4847 + 0.01065(\theta - 27) - 0.00186(\theta - 27)^2 + \\ 5.1776 \times 10^{-6}(\theta - 27)^3 + 1.23985 \times 10^{-6}(\theta - 27)^4 \end{pmatrix} D_0;$$

when $36° \leq \theta \leq 60°$, $$\rho(\theta) = \begin{pmatrix} 0.4418 - 0.01131(\theta - 36) + 0.000290563(\theta - 36)^2 - \\ 3.02877 \times 10^{-6}(\theta - 36)^3 - 2.66377 \times 10^{-8}(\theta - 36)^4 \end{pmatrix} D_0;$$

when $60° \leq \theta \leq 120°$, $$\rho(\theta) = \begin{pmatrix} 0.287 - 0.0025(\theta - 60) + 4.57118 \times 10^{-5}(\theta - 60)^2 - \\ 1.90487 \times 10^{-7}(\theta - 60)^3 + 2.28021 \times 10^{-9}(\theta - 60)^4 \end{pmatrix} D_0;$$

when $20° \leq \theta \leq 147°$, $$\rho(\theta) = \begin{pmatrix} 0.28995 + 0.0029(\theta - 120) + 0.000104586(\theta - 120)^2 + \\ 1.35828 \times 10^{-6}(\theta - 120)^3 - 6.80098 \times 10^{-8}(\theta - 120)^4 + \\ 3.45975 \times 10^{-9}(\theta - 120)^5 \end{pmatrix} D_0;$$

when $147° \leq \theta \leq 156°$, $$\rho(\theta) = \begin{pmatrix} 0.4847 + 0.01065(\theta - 147) - 0.00186(\theta - 147)^2 + \\ 5.1776 \times 10^{-6}(\theta - 147)^3 + 1.23985 \times 10^{-6}(\theta - 147)^4 \end{pmatrix} D_0;$$

when $156° \leq \theta \leq 180°$, $$\rho(\theta) = \begin{pmatrix} 0.4418 - 0.01131(\theta - 156) + 0.000290563(\theta - 156)^2 - \\ 3.02877 \times 10^{-6}(\theta - 156)^3 - 2.66377 \times 10^{-8}(\theta - 156)^4 \end{pmatrix} D_0;$$

when $180° \leq \theta \leq 240°$, $$\rho(\theta) = \begin{pmatrix} 0.287 - 0.0025(\theta - 180) + 4.57118 \times 10^{-5}(\theta - 180)^2 - \\ 1.90487 \times 10^{-7}(\theta - 180)^3 + 2.28021 \times 10^{-9}(\theta - 180)^4 \end{pmatrix} D_0;$$

when $240° \leq \theta \leq 267°$, $$\rho(\theta) = \begin{pmatrix} 0.28995 + 0.0029(\theta - 240) + 0.000104586(\theta - 240)^2 + \\ 1.35828 \times 10^{4}(\theta - 240)^2 - 6.80098 \times 10^{-3}(\theta - 240)^4 + \\ 3.45975 \times 10^{-9}(\theta - 240)^5 \end{pmatrix} D_0;$$

when $267° \leq \theta \leq 270°$, $$\rho(\theta) = \begin{pmatrix} 0.4847 + 0.01065(\theta - 267) - 0.00186(\theta - 267)^2 + \\ 5.1776 \times 10^{-6}(\theta - 267)^2 + 1.23985 \times 10^{-4}(\theta - 267)^4 \end{pmatrix} D_0;$$

when $270° \leq \theta \leq 300°$, $$\rho(\theta) = \begin{pmatrix} 0.4418 - 0.01131(\theta - 270) + 0.000290563(\theta - 270)^2 - \\ 3.02877 \times 10^{-4}(\theta - 270)^3 - 2.66377 \times 10^{-3}(\theta - 270)^4 \end{pmatrix} D_0;$$

when $300° \leq \theta \leq 360°$, $$\rho(\theta) = \begin{pmatrix} 0.287 - 0.0025(\theta - 180) + 4.57118 \times 10^{-5}(\theta - 180)^2 - \\ 1.90487 \times 10^{-7}(\theta - 180)^3 + 2.28021 \times 10^{-9}(\theta - 180)^4 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw;

the shape curve of the cross-section of said right screw 13 meets that:

when $0° \leq \theta \leq 85°$, $$\rho(\theta) = \begin{pmatrix} 0.32013 + 0.0006852050\theta + 0.00011173\theta^2 - 5.88903 \times 10^{-6}\theta^3 + \\ 1.80316 \times 10^{-7}\theta^4 - 3.03623 \times 10^{-9}\theta^5 + 2.64496 \times 10^{-11}\theta^6 - \\ 9.23845 \times 10^{-14}\theta^7 \end{pmatrix} D_0;$$

when $85° \leq \theta \leq 95°$, $$\rho(\theta) = \begin{pmatrix} 0.494681 + 0.00179(\theta - 85) - 0.000479273(\theta - 85)^2 + \\ 0.00010662(\theta - 85)^3 - 1.63619 \times 10^{-5}(\theta - 85)^4 + \\ 1.24974 \times 10^{-6}(\theta - 85)^5 - 3.77964 \times 10^{-8}(\theta - 85)^6 \end{pmatrix} D_0;$$

when $95° \leq \theta \leq 180°$, $$\rho(\theta) = \begin{pmatrix} 0.494832 - 0.000761246(\theta - 95) - 0.000126101(\theta - 95)^2 + \\ 4.25652 \times 10^{-6}(\theta - 95)^3 - 7.13683 \times 10^{-8}(\theta - 95)^4 + \\ 5.9942 \times 10^{-10}(\theta - 95)^5 - 1.98695 \times 10^{-12}(\theta - 95)^6 \end{pmatrix} D_0;$$

when $180° \leq \theta \leq 360°$, $$\rho(\theta) = \begin{pmatrix} 0.31789 - 0.00133(\theta - 180) - 8.60877 \times 10^{-6}(\theta - 180)^2 + \\ 5.0898 \times 10^{-7}(\theta - 180)^3 - 7.16212 \times 10^{-9}(\theta - 180)^4 + \\ 5.3005 \times 10^{-11}(\theta - 180)^5 - 2.05365 \times 10^{-13}(\theta - 180)^6 + \\ 3.64972 \times 10^{-16}(\theta - 180)^7 - 1.76708 \times 10^{-19}(\theta - 180)^8 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw; and the rotation speeds of said two lateral screws are the same, and the rotation speed ratio between each of the lateral screws and the central screw 6 is 3.

Embodiment 4

Figure 5:
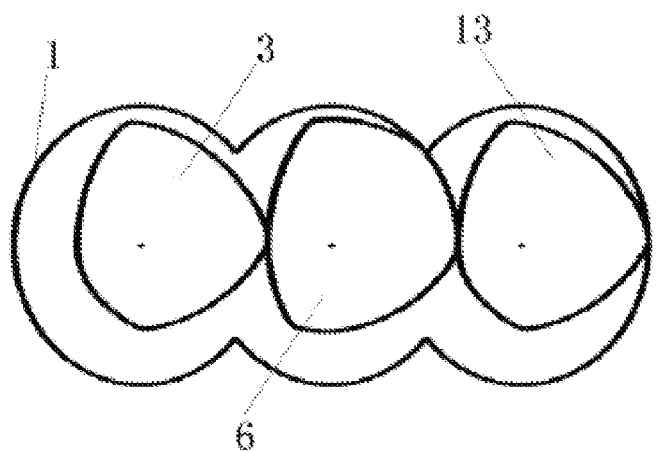
FIG. 5 is an enlarged structural schematic diagram of embodiment 4 cutting along A-A shown in FIG. 1.

The present embodiment has the same structure as that in embodiment 1, except the following features: as shown in FIG. 5, the phase angle difference between the positions of said left screw 3 and right screw 13 is 0°, ie., the shape of the cross-section of said left screw 3 is the same as that of the right screw 13. With the center points of the cylinder grooves of the barrel corresponding to the central screw 6 and each of the lateral screws respectively as poles, and the rays elicited horizontally rightwards from the poles (ie., in the orthogonal coordinate system, the rays in the positive direction of X axis of the connecting line through the center points of the cylinder grooves of the barrel) as polar axes, the shape curve of the cross-section of said central screw 6 meets that:

when $0° \leq \theta \leq 50°$, $\rho(\theta) = 0.5D_0$;

when $50° \leq \theta \leq 90°$, $$\rho(\theta) = \begin{pmatrix} 0.5 - 0.00309(\theta - 50) + \\ 0.000168331(\theta - 50)^2 - \\ 8.44083 \times 10^{-6}(\theta - 50)^3 + \\ 2.19035 \times 10^{-7}(\theta - 50)^4 - \\ 2.06434 \times 10^{-9}(\theta - 50)^5 \end{pmatrix} D_0;$$

when $90° \leq \theta \leq 101°$, $\rho(\theta) = 0.455 D_0$;

when $101° \leq \theta \leq 181°$, $$\rho(\theta) = \begin{pmatrix} 0.455 - 0.00143(\theta - 101) - \\ 0.000793059(\theta - 101)^2 + \\ 6.51522 \times 10^{-5}(\theta - 101)^3 - \\ 2.66487 \times 10^{-6}(\theta - 101)^4 + \\ 6.20495 \times 10^{-8}(\theta - 101)^5 - \\ 8.26745 \times 10^{-10}(\theta - 101)^6 + \\ 5.86449 \times 10^{-12}(\theta - 101)^7 - \\ 1.71691 \times 10^{-14}(\theta - 101)^8 \end{pmatrix} D_0;$$

when $181° \leq \theta \leq 193°$, $\rho(\theta) = 0.25 D_0$;

when $193° \leq \theta \leq 244°$, $$\rho(\theta) = \begin{pmatrix} 0.25 + 0.000361178(\theta - 193) - \\ 0.000107545(\theta - 193)^2 + \\ 0.00002068(\theta - 193)^3 - \\ 1.60164 \times 10^{-6}(\theta - 193)^4 + \\ 6.82867 \times 10^{-8}(\theta - 193)^5 - \\ 1.63573 \times 10^{-9}(\theta - 193)^6 + \\ 2.06803 \times 10^{-11}(\theta - 193)^7 - \\ 1.07375 \times 10^{-13}(\theta - 193)^8 \end{pmatrix} D_0;$$

when $244° \leq \theta \leq 353°$, $$\rho(\theta) = \begin{pmatrix} 0.31875 - 0.00104(\theta - 244) - \\ 3.31524 \times 10^{-5}(\theta - 244)^2 + \\ 4.32237 \times 10^{-6}(\theta - 244)^3 - \\ 1.67168 \times 10^{-7}(\theta - 244)^4 + \\ 3.54572 \times 10^{-9}(\theta - 244)^5 - \\ 4.16652 \times 10^{-11}(\theta - 244)^6 + \\ 2.55218 \times 10^{-13}(\theta - 244)^7 - \\ 6.34643 \times 10^{-16}(\theta - 244)^8 \end{pmatrix} D_0;$$

when $353° \leq \theta \leq 360°$, $\rho(\theta) = 0.5 D_0$;

wherein, θ is a value corresponding to the polar angle degree, ρ is a polar radius, and $D_0$ is an inner diameter of the cylinder groove of the barrel corresponding to said screw;

the shape curve of the cross-section of said right screw 13 meets that:

when $0° \leq \theta \leq 12°$, $\rho(\theta) = 0.5D_0$;

when $12° \leq \theta \leq 93°$, $$\rho(\theta) = \begin{pmatrix} 0.5 - 0.00165(\theta - 12) - \\ 0.000134915(\theta - 12)^2 + \\ 0.000011814(\theta - 12)^3 - \\ 4.87051 \times 10^{-7}(\theta - 12)^4 + \\ 1.1766 \times 10^{-8}(\theta - 12)^5 - \\ 1.64659 \times 10^{-10}(\theta - 12)^6 + \\ 1.23355 \times 10^{-12}(\theta - 12)^7 - \\ 3.82327 \times 10^{-15}(\theta - 12)^8 \end{pmatrix} D_0;$$

when $93° \leq \theta \leq 173°$, $$\rho(\theta) = \begin{pmatrix} 0.44967 - 0.0012(\theta - 93) - \\ 0.000680386(\theta - 93)^2 + \\ 5.15007 \times 10^{-5}(\theta - 93)^3 - \\ 1.99396 \times 10^{-6}(\theta - 93)^4 + \\ 4.48589 \times 10^{-8}(\theta - 93)^5 - \\ 5.85347 \times 10^{-10}(\theta - 93)^6 + \\ 4.10152 \times 10^{-12}(\theta - 93)^7 - \\ 1.19263 \times 10^{-14}(\theta - 93)^8 \end{pmatrix} D_0;$$

when $173° \leq \theta \leq 230°$, $\rho(\theta) = 0.25 D_0$;

when $230° \leq \theta \leq 272°$, $$\rho(\theta) = \begin{pmatrix} 0.25 + 0.000575232(\theta - 230) - \\ 0.000134433(\theta - 230)^2 + \\ 2.28201 \times 10^{-5}(\theta - 230)^3 - \\ 1.7105 \times 10^{-6}(\theta - 230)^4 + \\ 7.37301 \times 10^{-8}(\theta - 230)^5 - \\ 1.86726 \times 10^{-9}(\theta - 230)^6 + \\ 2.61628 \times 10^{-11}(\theta - 230)^7 - \\ 1.5782 \times 10^{-13}(\theta - 230)^8 \end{pmatrix} D_0;$$

when $272° \leq \theta \leq 283°$, $\rho(\theta) = 0.295 D_0$;

when $282° \leq \theta \leq 360°$, $$\rho(\theta) = \begin{pmatrix} 0.295 + 0.000132721(\theta - 283) + \\ 4.58737 \times 10^{-5}(\theta - 283)^2 - \\ 3.34923 \times 10^{-6}(\theta - 283)^3 + \\ 2.15388 \times 10^{-7}(\theta - 283)^4 - \\ 6.89212 \times 10^{-9}(\theta - 283)^5 + \\ 1.18802 \times 10^{-10}(\theta - 283)^6 - \\ 1.04706 \times 10^{-12}(\theta - 283)^7 + \\ 3.70486 \times 10^{-15}(\theta - 283)^8 \end{pmatrix} D_0;$$

wherein, θ is a value corresponding to the polar angle degree, ρ is a polar radius, and $D_0$ is an inner diameter of the cylinder groove of the barrel corresponding to said screw; and the rotation speeds of said two lateral screws are the same, and the rotation speed ratio between each of the lateral screws and the central screw 6 is 1.

Embodiment 5

The present embodiment has the same structure as that in embodiment 1, except the following features: the rotation speeds of said two lateral screws are the same, and the rotation speed ratio between each of the lateral screws and the central screw is 0.5. The peak angle of the screw ridge of said central screw is in a range of 0-180°.

Embodiment 6

The present embodiment has the same structure as that in embodiment 1, except the following features: the rotation speeds of said two lateral screws are the same, and the rotation speed ratio between each of the lateral screws and the central screw is 0.5. The peak angle of the screw ridge of said central screw is in a range of 0-180°.

Embodiment 7

Figure 6:
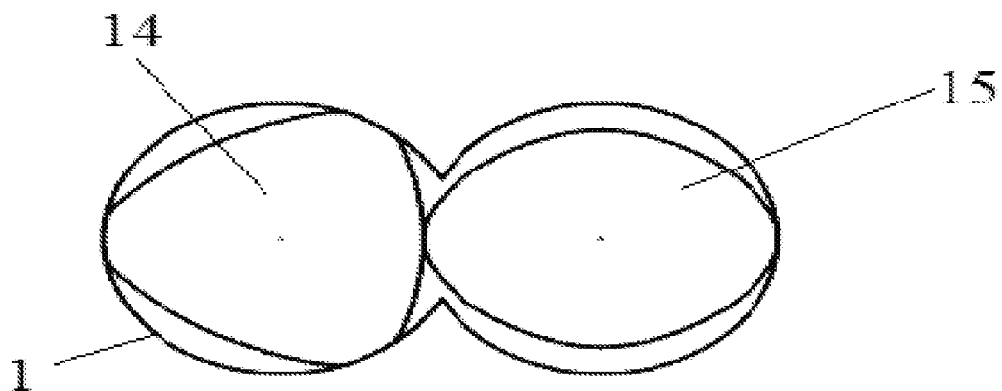
FIG. 6 is a schematic diagram of the cross-section shape of each of the screws in embodiment 7.

The present embodiment has the same structure as that in embodiment 1, except the following features: as shown in FIG. 6, said lateral screw is only one screw, which is provided on the side of the central screw, and engaged with the central screw; the inner cavity of said barrel is consisted of two cylinder grooves which have the same inner diameter and are communicated with each other, each of the cylinder grooves is fitted with the lateral screw, and the central screw respectively; the central axis distance between the two cylinder grooves is equal to the centerline distance between the central screw and the lateral screw, ie., $(D_0+D_i)/2$, at this time, $D_0/D_i=1.25$, wherein, $D_0$ is an inner diameter of the cylinder groove of the barrel, and $D_i$ is a diameter of the screw. In the present embodiment, the lateral screw 15 corresponds to the right screw 13 in embodiment 1, and the central screw 14 corresponds to the central screw 6 in embodiment 1.

The lead of screw threads between the central screw 14 and the lateral screw 15 is in a range of $0.1$-$10000$ $D_0$.

With the center points of the cylinder grooves of the barrel corresponding to the central screw 14 and the lateral screw 15 respectively as poles, and the rays elicited horizontally rightwards from the poles (ie., in the orthogonal coordinate system, the positive direction of X axis) as polar axes, the starting position of the polar angle of each of the screws is a bisector of the peak angle of the screw ridge, with the counterclockwise direction as a positive direction.

The shape curve of the cross-section of said central screw 14 is symmetric with respect to the ray of $\theta=120°$ and the ray of $\theta=240°$, and the polar angle is within $0°\leq\theta\leq120°$, the corresponding curve meets that:

when $0 \leq \theta \leq 2°$, $\rho(\theta) = 0.5D_0$;

when $2° \leq \theta \leq 58°$, $$\rho(\theta) = \begin{pmatrix} 0.5 - 0.00243(\theta-2) + \\ 0.00106(\theta-2)^2 - 1.67316\times10^4(\theta-2)^3 + \\ 1.08849\times10^{-5}(\theta-2)^4 - \\ 3.74006\times10^{-7}(\theta-2)^5 + \\ 7.15583\times10^{-9}(\theta-2)^6 - \\ 7.21345\times10^{-11}(\theta-2)^7 + \\ 2.98968\times10^{-13}(\theta-2)^8 \end{pmatrix} D_0;$$

when $58° \leq \theta \leq 62°$, $\rho(\theta) = 0.4D_0$;

when $62° \leq \theta \leq 118°$, $$\rho(\theta) = \begin{pmatrix} 0.4 - 7.16547\times10^{-4}(\theta-62) + \\ 3.66366\times10^{-4}(\theta-62)^2 - \\ 5.72993\times10^{-5}(\theta-62)^3 + \\ 4.76052\times10^{-6}(\theta-62)^4 - \\ 2.09619\times10^{-7}(\theta-62)^5 + \\ 5.0282\times10^{-9}(\theta-62)^6 - \\ 6.18021\times10^{-11}(\theta-62)^7 + \\ 3.03396\times10^{-13}(\theta-62)^8 \end{pmatrix} D_0;$$

when $118° \leq \theta \leq 120°$, $\rho(\theta) = 0.5D_0$ wherein, $\theta$ is a value corresponding to the polar angle degree, $\rho$ is a polar radius, and $D_0$ is an inner diameter of the cylinder groove of the barrel corresponding to said screw;

the shape curve of the cross section of said lateral screw 15 is symmetric with respective to the ray of $\theta=0°$ and the ray of $\theta=180°$ (ie., the positive direction of the X axial in the orthogonal coordinate system), and the polar angle is within $0°\leq\theta\leq180°$, the corresponding curve meets that:

when $0° \leq \theta \leq 3°$, $\rho(\theta) = 0.4D_0$;

when $3° \leq \theta \leq 87°$, $$\rho(\theta) = \begin{pmatrix} 0.40053 + 1.91042\times10^{-4}(\theta-3) - \\ 5.44854\times10^{-5}(\theta-3)^2 + \\ 5.78786\times10^{-6}(\theta-3)^3 - \\ 2.60181\times10^{-7}(\theta-3)^4 + \\ 6.77081\times10^{-9}(\theta-3)^5 - \\ 1.00659\times10^{-10}(\theta-3)^6 + \\ 7.9546\times10^{-13}(\theta-3)^7 - \\ 2.59711\times10^{-15}(\theta-3)^8 \end{pmatrix} D_0;$$

when $87° \leq \theta \leq 93°$, $\rho(\theta) = 0.5D_0$;

when $93° \leq \theta \leq 177°$, $$\rho(\theta) = \begin{pmatrix} 0.5 + 5.59592\times10^{-4}(\theta-93) - \\ 3.44997\times10^{-4}(\theta-93)^2 + \\ 1.95669\times10^{-5}(\theta-93)^3 - \\ 6.25514\times10^{-7}(\theta-93)^4 + \\ 1.2176\times10^{-8}(\theta-93)^5 - \\ 1.43316\times10^{-10}(\theta-93)^6 + \\ 9.29081\times10^{-13}(\theta-93)^7 - \\ 2.54457\times10^{-15}(\theta-93)^8 \end{pmatrix} D_0;$$

when $177° \leq \theta \leq 180°$, $\rho(\theta) = 0.4D_0$;

wherein, $\theta$ is a value corresponding to the polar angle degree, $\rho$ is a polar radius, and $D_0$ is an inner diameter of the cylinder groove of the barrel corresponding to said screw.

The rotation speed ratio between said lateral screw 15 and the central screw 14 is 1.5.

Embodiment 8

Figure 7:
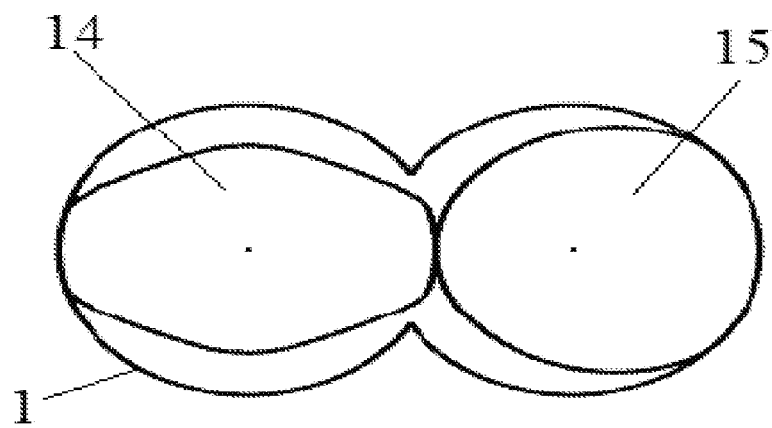
FIG. 7 is a schematic diagram of the cross-section shape of each of the screws in embodiment 8.

The present embodiment has the same structure as that in embodiment 7, except the following features: in the present embodiment, the lateral screw 15 corresponds to the right screw 13 in embodiment 1, and the central screw 14 corresponds to the central screw 6 in embodiment 1. As shown in FIG. 7, with the center points of the cylinder grooves of the barrel corresponding to the central screw 14 and the lateral screw 15 respectively as poles, and the rays elicited horizontally rightwards from the poles as polar axes, the shape curve of the cross-section of said central screw 14 is symmetric with respective to the ray of θ=0° and the ray of θ=180°, and the polar angle is within 0°≤θ≤180°, the corresponding curve meets that:

when $0° \leq \theta \leq 15°$, $\rho(\theta) = 0.5D_0$;
when $15° \leq \theta \leq 69.5°$, $$\rho(\theta) = \begin{pmatrix} 0.5 - 0.00188(\theta - 15) - \\ 8.21227 \times 10^{-4}(\theta - 15)^2 + \\ 8.53313 \times 10^{-5}(\theta - 15)^3 - \\ 4.61141 \times 10^{-6}(\theta - 15)^4 + \\ 1.48589 \times 10^{-7}(\theta - 15)^5 - \\ 2.82368 \times 10^{-9}(\theta - 15)^6 + \\ 2.90967 \times 10^{-11}(\theta - 15)^7 - \\ 1.25091 \times 10^{-13}(\theta - 15)^8 \end{pmatrix} D_0;$$

when $69.5° \leq \theta \leq 110.5°$, $\rho(\theta) = 0.35714D_0$;
when $110.5° \leq \theta \leq 165°$, $$\rho(\theta) = \begin{pmatrix} 0.35714 + 3.98268 \times 10^{-4}(\theta - 110.5) - \\ 1.91593 \times 10^{-4}(\theta - 110.5)^2 + \\ 3.54059 \times 10^{-5}(\theta - 110.5)^3 - \\ 2.64776 \times 10^{-6}(\theta - 110.5)^4 + \\ 1.08848 \times 10^{-7}(\theta - 110.5)^5 - \\ 2.49656 \times 10^{-9}(\theta - 110.5)^6 + \\ 3.00627 \times 10^{-11}(\theta - 110.5)^7 - \\ 1.48135 \times 10^{-13}(\theta - 110.5)^8 \end{pmatrix} D_0;$$

when $165° \leq \theta \leq 180°$, $\rho(\theta) = 0.5D_0$;

wherein, θ is a value corresponding to the polar angle degree, ρ is a polar radius, and $D_0$ is an inner diameter of the cylinder groove of the barrel corresponding to said screw;

the shape curve of the cross-section of said right screw is symmetric with respective to the ray of θ=0° and the ray of θ=180°, and the polar angle is within 0°≤θ≤180°, the corresponding curve meets that:

when $0° \leq \theta \leq 41°$, $\rho(\theta) = 0.5D_0$;
when $41° \leq \theta \leq 150°$, $$\rho(\theta) = \begin{pmatrix} 0.5 + 5.80648 \times 10^{-4}(\theta - 41) - \\ 1.0674 \times 10^{-4}(\theta - 41)^2 - \\ 4.94415 \times 10^{-7}(\theta - 41)^3 \\ 1.14699 \times 10^{-7}(\theta - 41)^4 - \\ 2.86057 \times 10^{-9}(\theta - 41)^5 \\ 3.31268 \times 10^{-11}(\theta - 41)^6 - \\ 1.89458 \times 10^{-13}(\theta - 41)^7 \\ 4.31702 \times 10^{-16}(\theta - 41)^8 \end{pmatrix} D_0;$$

when $150° \leq \theta \leq 180°$, $\rho(\theta) = 0.35714D_0$;

wherein, θ is a value corresponding to the polar angle degree, ρ is a polar radius, and $D_0$ is an inner diameter of the cylinder groove of the barrel corresponding to said screw.

The rotation speed ratio between said lateral screw 15 and the central screw 14 is 2.0.

Embodiment 9

Figure 8:
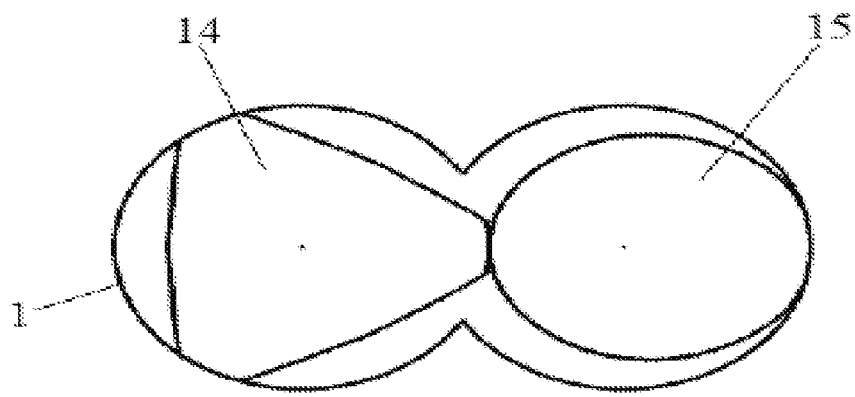
FIG. 8 is a schematic diagram of the cross-section shape of each of the screws in embodiment 9.

The present embodiment has the same structure as that in embodiment 7, except the following features: in the present embodiment, the lateral screw 15 corresponds to the right screw 13 in embodiment 1, and the central screw 14 corresponds to the central screw 6 in embodiment 1. As shown in FIG. 8, with the center points of the cylinder grooves of the barrel corresponding to the central screw 14 and the lateral screw 15 respectively as poles, and the rays elicited horizontally rightwards from the poles as polar axes, the shape curve of the cross-section of said central screw is symmetric with respective to the ray of θ=120° and the ray of θ=240°, and the polar angle is within 0°≤θ≤120°, the corresponding curve meets that:

when $0° \leq \theta \leq 10$, $\rho(\theta) = 0.5D_0$;
when $10° \leq \theta \leq 58°$, $$\rho(\theta) = \begin{pmatrix} 0.5 - 0.00831(\theta - 10) + \\ 2.693515 \times 10^{-4}(\theta - 10)^2 - \\ 2.05095 \times 10^{-5}(\theta - 10)^3 + \\ 1.59416 \times 10^{-6}(\theta - 10)^4 - \\ 6.95534 \times 10^{-8}(\theta - 10)^5 + \\ 1.65362 \times 10^{-9}(\theta - 10)^6 - \\ 2.02237 \times 10^{-11}(\theta - 10)^7 + \\ 9.97816 \times 10^{-14}(\theta - 10)^8 \end{pmatrix} D_0;$$

when $58° \leq \theta \leq 62°$, $\rho(\theta) = 0.357143D_0$;
when $62° \leq \theta \leq 110°$, $$\rho(\theta) = \begin{pmatrix} 0.35714 - 4.90697 \times 10^{-5}(\theta - 62) + \\ 1.02434 \times 10^{-5}(\theta - 62)^2 \\ 1.22629 \times 10^{-6}(\theta - 62)^3 + \\ 1.76059 \times 10^{-7}(\theta - 62)^4 - \\ 1.56233 \times 10^{-8}(\theta - 62)^5 + \\ 5.21936 \times 10^{-10}(\theta - 62)^6 - \\ 7.85637 \times 10^{-12}(\theta - 62)^7 + \\ 4.47471 \times 10^{-14}(\theta - 62)^8 \end{pmatrix} D_0;$$

when $110° \leq \theta \leq 120°$, $\rho(\theta) = 0.5D_0$;

wherein, θ is a value corresponding to the polar angle degree, ρ is a polar radius, and $D_0$ is an inner diameter of the cylinder groove of the barrel corresponding to said screw;

the shape curve of the cross-section of said right screw is symmetric with respective to the ray of θ=0° and the ray of θ=180°, and the polar angle is within 0°≤θ≤180°, the corresponding curve meets that:

when $0° \leq \theta \leq 30°$, $\rho(\theta) = 0.35714D_0$;

when $30° \leq \theta \leq 174°$, $$\rho(\theta) = \begin{pmatrix} 0.35714 - 1.2981 \times 10^{-4}(\theta - 30) + \\ 4.15281 \times 10^{-5}(\theta - 30)^2 - \\ 2.15177 \times 10^{-6}(\theta - 30)^3 + \\ 6.69687 \times 10^{-8}(\theta - 30)^4 - \\ 1.10347 \times 10^{-9}(\theta - 30)^5 + \\ 9.90148 \times 10^{-12}(\theta - 30)^6 - \\ 4.55739 \times 10^{-14}(\theta - 30)^7 + \\ 8.37526 \times 10^{-17}(\theta - 30)^8 \end{pmatrix} D_0;$$

when $174° \leq \theta \leq 180°$, $\rho(\theta) = 0.5D_0$;

wherein, θ is a value corresponding to the polar angle degree, ρ is a polar radius, and $D_0$ is an inner diameter of the cylinder groove of the barrel corresponding to said screw.

The rotation speed ratio between said lateral screw 15 and the central screw 14 is 3.0.

Embodiment 10

Figure 9:
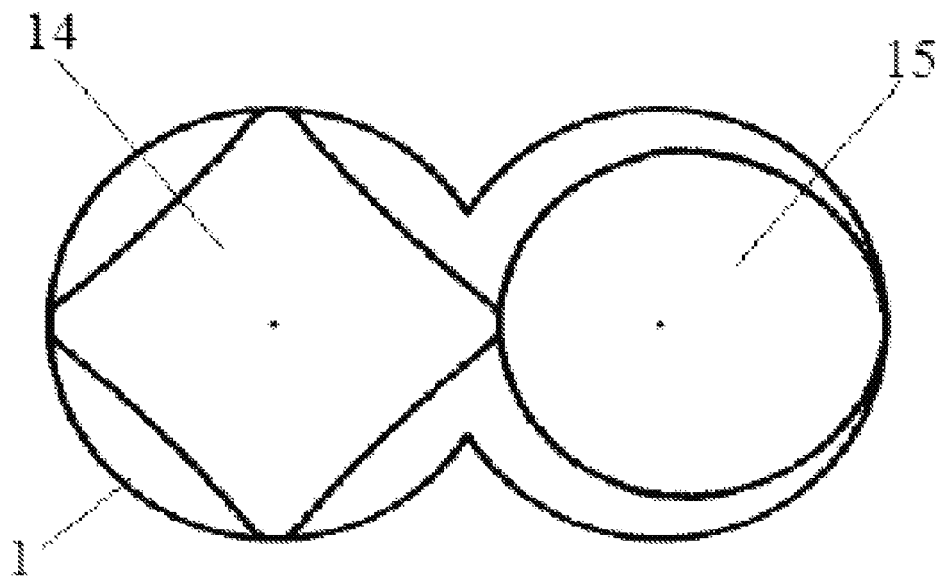
FIG. 9 is a schematic diagram of the cross-section shape of each of the screws in embodiment 10.

The present embodiment has the same structure as that in embodiment 7, except the following features: as shown in FIG. 9, with the center points of the cylinder grooves of the barrel corresponding to the central screw 14 and the lateral screw 15 respectively as poles, and the rays elicited horizontally rightwards from the poles as polar axes, the shape curve of the cross-section of said central screw is symmetric with respective to the ray of θ=0°, the ray of θ=90°, and the ray of θ=270°, and the polar angle is within 0°≤θ≤90°, the corresponding curve meets that:

when $0° \leq \theta \leq 3°$, $\rho(\theta) = 0.5D_0$;
when $3° \leq \theta \leq 87°$, $$\rho(\theta) = \begin{pmatrix} 0.5 - 0.00776(\theta - 3) + \\ 3.35014 \times 10^{-5}(\theta - 3)^2 + \\ 8.68488 \times 10^{-6}(\theta - 3)^3 - \\ 3.48947 \times 10^{-7}(\theta - 3)^4 + \\ 6.34905 \times 10^{-9}(\theta - 3)^5 - \\ 5.62555 \times 10^{-11}(\theta - 3)^6 + \\ 1.98268 \times 10^{-13}(\theta - 3)^7 \end{pmatrix} D_0;$$

when $87° \leq \theta \leq 90°$, $\rho(\theta) = 0.5D_0$;

wherein, θ is a value corresponding to the polar angle degree, ρ is a polar radius, and $D_0$ is an inner diameter of the cylinder groove of the barrel corresponding to said screw;

the shape curve of the cross-section of said lateral screw 15 is symmetric with respective to the ray of θ=0° and the ray of θ=180°, and the polar angle is within 0°≤θ≤180°, the corresponding curve meets that:

when $0° \leq \theta \leq 12°$, $\rho(\theta) = 0.35714D_0$;

when $12° \leq \theta \leq 180°$, $$\rho(\theta) = \begin{pmatrix} 0.35714 + 1.16393 \times 10^{-4}(\theta - 12) + \\ 1.09189 \times 10^{-6}(\theta - 12)^2 + \\ 1.02469 \times 10^{-7}(\theta - 12)^3 - \\ 7.39494 \times 10^{-10}(\theta - 12)^4 - \\ 2.22006 \times 10^{-12}(\theta - 12)^5 \\ 5.1641 \times 10^{-14}(\theta - 12)^6 - \\ 1.7693 \times 10^{-16}(\theta - 12)^7 \end{pmatrix} D_0;$$

wherein, θ is a value corresponding to the polar angle degree, ρ is a polar radius, and $D_0$ is an inner diameter of the cylinder groove of the barrel corresponding to said screw.

The rotation speed ratio between said lateral screw 15 and the central screw 14 is 4.0.

Embodiment 11

Figure 10:
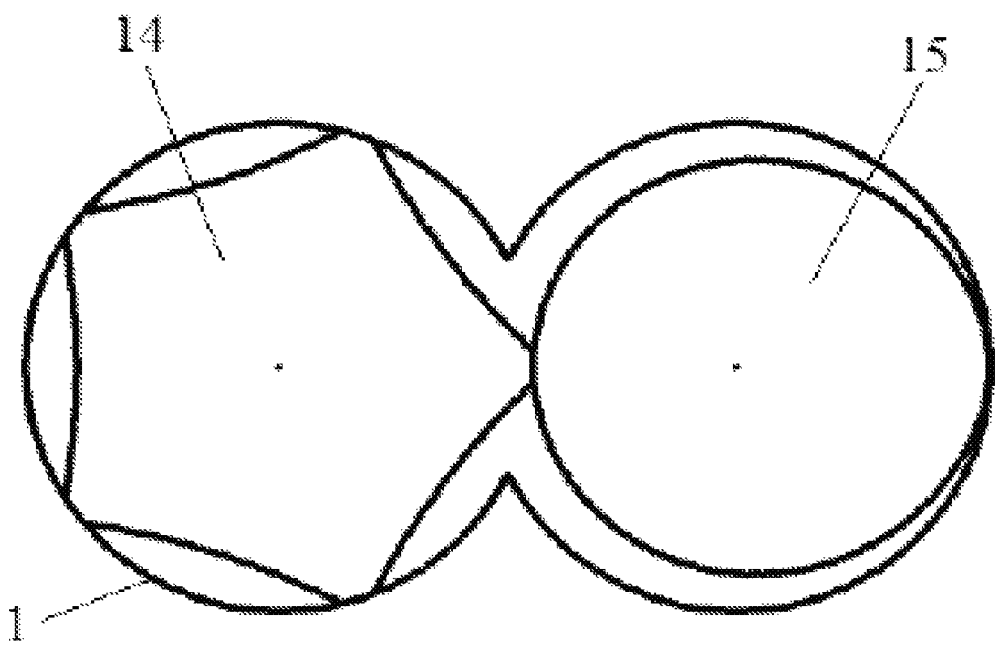
FIG. 10 is a schematic diagram of the cross-section shape of each of the screws in embodiment 11.

The present embodiment has the same structure as that in embodiment 7, except the following features: as shown in FIG. 10, with the center points of the cylinder grooves of the barrel corresponding to the central screw 14 and the lateral screw 15 respectively as poles, and the rays elicited horizontally rightwards from the poles as polar axes, the shape curve of the cross-section of said central screw is symmetric with respective to the ray of θ=0°, the ray of θ=72°, the ray of θ=144°, the ray of θ=216°, and the ray of θ=288°, and the polar angle is within 0°≤θ≤72°, the corresponding curve meets that:

when $0° \leq \theta \leq 4°$, $\rho(\theta) = 0.5D_0$;

when $4° \leq \theta \leq 34°$, $$\rho(\theta) = \begin{pmatrix} 0.5 - 0.02464(\theta - 4) + \\ 0.00617(\theta - 4)^2 - 9.00044 \times 10^{-4}(\theta - 4)^3 + \\ 7.03593 \times 10^{-5}(\theta - 4)^4 - \\ 2.98822 \times 10^{-6}(\theta - 4)^5 + \\ 6.51822 \times 10^{-8}(\theta - 4)^6 - \\ 5.71897 \times 10^{-10}(\theta - 4)^7 \end{pmatrix} D_0;$$

when $34° \leq \theta \leq 38°$, $\rho(\theta) = 0.4D_0$;

when $38° \leq \theta \leq 68°$, $$\rho(\theta) = \begin{pmatrix} 0.4 + 2.66133 \times 10^{-4}(\theta - 38) - \\ 4.49843 \times 10^{-5}(\theta - 38)^2 + \\ 3.42164 \times 10^{-5}(\theta - 38)^3 - \\ 4.56139 \times 10^{-6}(\theta - 38)^4 + \\ 3.02712 \times 10^{-7}(\theta - 38)^5 - \\ 9.6014 \times 10^{-9}(\theta - 38)^6 + \\ 1.16449 \times 10^{-10}(\theta - 38)^7 \end{pmatrix} D_0;$$

when $68° \leq \theta \leq 72°$, $\rho(\theta) = 0.5D_0$;

wherein, θ is a value corresponding to the polar angle degree, ρ is a polar radius, and $D_0$ is an inner diameter of the cylinder groove of the barrel corresponding to said screw;

the shape curve of the cross-section of said lateral screw 15 is symmetric with respective to the ray of θ=0° and the ray of θ=180°, and the polar angle is within 0°≤θ≤180°, the corresponding curve meets that:

when $0° \leq \theta \leq 20°$, $\rho(\theta) = 0.4D_0$;

when $20° \leq \theta \leq 170°$, $$\rho(\theta) = \begin{pmatrix} 0.4 + 4.16738 \times 10^{-4}(\theta - 20) - \\ 1.72721 \times 10^{-5}(\theta - 20)^2 + \\ 7.47552 \times 10^{-7}(\theta - 20)^3 - \\ 1.38142 \times 10^{-8}(\theta - 20)^4 + \\ 1.46263 \times 10^{-10}(\theta - 20)^5 - \\ 9.05881 \times 10^{-13}(\theta - 20)^6 + \\ 3.10626 \times 10^{-15}(\theta - 20)^7 - \\ 4.67939 \times 10^{-18}(\theta - 20)^8 \end{pmatrix} D_0;$$

when $170° \leq \theta \leq 180°$, $\rho(\theta) = 0.5D_0$;

wherein, θ is a value corresponding to the polar angle degree, ρ is a polar radius, and $D_0$ is an inner diameter of the cylinder groove of the barrel corresponding to said screw.

The rotation speed ratio between said lateral screw 15 and the central screw 14 is 5.0.

Each of the embodiments described above is the preferred embodiment of the present invention, but the embodiments of the present invention are not limited to the above-mentioned embodiments, any other changes, modifications, substitutions, combinations, and simplifications made without departing from the spirit and principle of the present invention, are all equivalent replacement modes, and should be encompassed within the protection scope of the present invention.

The invention claimed is:

1. A self-cleaning plasticizing venting and extruding apparatus by co-rotating non-twin multi-screws, comprising a screw mechanism, a barrel, a feeding port, a venting port, a discharging port, and a driving mechanism, wherein said driving mechanism is provided at the ends of the barrel respectively, and is connected to the screw mechanism; wherein said screw mechanism is provided inside the barrel, and placed horizontally, and the inner section of the barrel is divided into a solid transporting zone, a melting zone, a venting zone and a compounding and extruding zone; said feeding port is provided above the barrel of the solid transporting zone, said venting port is provided above the barrel of the venting zone, and both the feeding port and the venting port are communicated with the barrel; said discharging port is provided at the end of the barrel, characterized in that said screw mechanism comprises non-uniform shaped central screw and lateral screws, the axis of the central screw is coincided with that of the barrel, the lateral screws are engaged with the central screw, and the contour lines of the threads of the central screw and the lateral screws are tangent to the inner wall of the barrel; said driving mechanism is connected to the central screw and the lateral screws respectively, wherein:

said lateral screws are two screws, left screw and right screw, which are provided on both sides of the central screw respectively, and engaged with the central screw;

the inner cavity of said barrel is consisted of three cylinder grooves which are communicated with each other, each of the cylinder grooves is fitted with the left screw, the central screw and the right screw respectively; the central axis distances from the cylinder grooves on both sides to the cylinder groove at the central position are equal to the centerline distances from the central screw to the left screw and right screw;

the shape of the cross-section of said left screw is the same as the curve shape formed after the cross-section of the right screw is rotated counterclockwise by 180° along the center point of the cylinder groove of the barrel corresponding to the central screw; with the center points of the cylinder grooves of the barrel corresponding to the central screw and each of the lateral screws respectively as poles, and the rays elicited horizontally rightwards from the poles as polar axes, the shape curve of the cross-section of said central screw meets that:

when $0° \leq \theta \leq 25°$, $$\rho(\theta) = \begin{pmatrix} 0.32256 + 0.00392\theta + \\ 0.000309497\theta^2 - 2.57326 \times 10^{-5}\theta^3 + \\ 9.28644 \times 10^{-7}\theta^4 + 1.8713 \times 10^{-8}\theta^5 - \\ 8.12786 \times 10^{-10}\theta^6 - \\ 9.61005 \times 10^{-12}\theta^7 \end{pmatrix} D_0;$$

when $25° \leq \theta \leq 63°$, $\rho(\theta) = 0.5D_0$;

when $63° \leq \theta \leq 123°$, $$\rho(\theta) = \begin{pmatrix} 0.5 + 0.000823585(\theta - 63) - \\ 0.00134(\theta - 63)^2 + \\ 8.00734 \times 10^{-5}(\theta - 63)^3 - \\ 2.14653 \times 10^{-6}(\theta - 63)^4 + \\ 2.76223 \times 10^{-8}(\theta - 63)^5 - \\ 1.37762 \times 10^{-10}(\theta - 63)^6 \end{pmatrix} D_0;$$

when $123° \leq \theta \leq 147°$, $$\rho(\theta) = \begin{pmatrix} 0.25391 - 0.00207(\theta - 123) + \\ 0.000573645(\theta - 123)^2 - \\ 8.45874 \times 10^{-5}(\theta - 123)^3 + \\ 6.53416 \times 10^{-6}(\theta - 123)^4 - \\ 2.56256 \times 10^{-7}(\theta - 123)^5 + \\ 4.47098 \times 10^{-9}(\theta - 123)^6 - \\ 2.03618 \times 10^{-11}(\theta - 123)^7 \end{pmatrix} D_0;$$

when $147° \leq \theta \leq 205°$, $$\rho(\theta) = \begin{pmatrix} 0.25374 + 0.000730048(\theta - 147) - \\ 0.000156535(\theta - 147)^2 + \\ 3.73081 \times 10^{-5}(\theta - 147)^3 - \\ 3.07839 \times 10^{-6}(\theta - 147)^4 + \\ 1.32913 \times 10^{-7}(\theta - 147)^5 - \\ 3.10949 \times 10^{-9}(\theta - 147)^6 + \\ 3.74465 \times 10^{-11}(\theta - 147)^7 - \\ 1.81606 \times 10^{-13}(\theta - 147)^8 \end{pmatrix} D_0;$$

-continued when $205° \leq \theta \leq 243°$, $\rho(\theta) = 0.5D_0$;

when $243° \leq \theta \leq 307°$, $$\rho(\theta) = \begin{pmatrix} 0.5 + 0.00369(\theta - 243) - \\ 0.00226(\theta - 243)^2 + 0.000184965(\theta - 243)^3 - \\ 7.94221 \times 10^{-6}(\theta - 243)^4 + \\ 2.00615 \times 10^{-7}(\theta - 243)^5 - \\ 2.9807 \times 10^{-9}(\theta - 243)^6 + \\ 2.4097 \times 10^{-11}(\theta - 243)^7 - \\ 8.17763 \times 10^{-14}(\theta - 243)^8 \end{pmatrix} D_0;$$

when $307° \leq \theta \leq 323°$, $$\rho(\theta) = \begin{pmatrix} 0.2568 - 0.00882(\theta - 307) + 0.00414(\theta - 307)^2 - \\ 0.000908651(\theta - 307)^3 + \\ 0.000100777(\theta - 307)^4 - \\ 5.50309 \times 10^{-6}(\theta - 307)^5 + \\ 1.20454 \times 10^{-7}(\theta - 307)^6 - \\ 1.95559 \times 10^{-10}(\theta - 307)^7 \end{pmatrix} D_0;$$

when $323° \leq \theta \leq 360°$, $$\rho(\theta) = \begin{pmatrix} 0.25618 + 0.00082668(\theta - 323) - \\ 0.000319894(\theta - 323)^2 + \\ 4.17742 \times 10^{-5}(\theta - 323)^3 - \\ 2.08266 \times 10^{-6}(\theta - 323)^4 + \\ 4.80871 \times 10^{-8}(\theta - 323)^5 - \\ 4.18424 \times 10^{-10}(\theta - 323)^6 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw;

the shape curve of the cross-section of said right screw meets that:

when $0° \leq \theta \leq 80°$, $$\rho(\theta) = \begin{pmatrix} 0.28446 + 0.00173\theta - 4.07776 \times 10^{-6}\theta^2 + \\ 4.49932 \times 10^{-7}\theta^3 - 3.26681 \times 10^{-9}\theta^4 \end{pmatrix} D_0;$$

when $80° \leq \theta \leq 100°$, $$\rho(\theta) = \begin{pmatrix} 0.49331 + 0.00156(\theta - 80) + \\ 3.82324 \times 10^{-5}(\theta - 80)^2 - \\ 4.32369 \times 10^{-5}(\theta - 80)^3 + \\ 5.05212 \times 10^{-6}(\theta - 80)^4 - \\ 2.3955 \times 10^{-7}(\theta - 80)^5 + \\ 4.02621 \times 10^{-9}(\theta - 80)^6 \end{pmatrix} D_0;$$

when $100° \leq \theta \leq 229°$, $$\rho(\theta) = \begin{pmatrix} 0.49336 - 0.00325(\theta - 100) - \\ 4.70431 \times 10^{-6}(\theta - 100)^2 + \\ 2.18207 \times 10^{-7}(\theta - 100)^3 - \\ 7.76735 \times 10^{-10}(\theta - 100)^4 \end{pmatrix} D_0;$$

-continued when $229° \leq \theta \leq 305°$, $\rho(\theta) = 0.25D_0$;

when $305° \leq \theta \leq 360°$, $$\rho(\theta) = \begin{pmatrix} 0.25 - 8.84562 \times 10^{-5}(\theta - 305) + \\ 2.30409 \times 10^{-5}(\theta - 305)^2 - \\ 8.10513 \times 10^{-7}(\theta - 305)^3 + \\ 2.00086 \times 10^{-8}(\theta - 305)^4 - \\ 1.56195 \times 10^{-10}(\theta - 305)^5 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw;

or, the shape curve of the cross-section of said central screw meets that:

when $0° \leq \theta \leq 23°$, $$\rho(\theta) = \begin{pmatrix} 0.39546 + 0.00436\theta - \\ 0.000328898\theta^2 + 0.0000496150\theta^3 - \\ 2.50164 \times 10^{-6}\theta^4 + 5.0823 \times 10^{-8}\theta^5 - \\ 4.85534 \times 10^{-10}\theta^6 \end{pmatrix} D_0;$$

when $23° \leq \theta \leq 145°$, $$\rho(\theta) = \begin{pmatrix} 0.48059 + 0.000898536(\theta - 23) - \\ 0.000962297(\theta - 23)^2 + \\ 5.0179 \times 10^{-5}(\theta - 23)^3 - \\ 1.28633 \times 10^{-6}(\theta - 23)^4 + \\ 1.88747 \times 10^{-8}(\theta - 23)^5 - \\ 1.6028 \times 10^{-10}(\theta - 23)^6 + \\ 7.32557 \times 10^{-13}(\theta - 23)^7 - \\ 1.39342 \times 10^{-15}(\theta - 145)^8 \end{pmatrix} D_0;$$

when $145° \leq \theta \leq 202°$, $$\rho(\theta) = \begin{pmatrix} 0.35035 - 0.000044154(\theta - 145) + \\ 6.21993 \times 10^{-5}(\theta - 145)^2 - \\ 8.31288 \times 10^{-6}(\theta - 145)^3 + \\ 6.56112 \times 10^{-7}(\theta - 145)^4 - \\ 2.23522 \times 10^{-8}(\theta - 145)^5 + \\ 3.57533 \times 10^{-10}(\theta - 145)^6 - \\ 2.18353 \times 10^{-12}(\theta - 145)^7 \end{pmatrix} D_0;$$

when $202° \leq \theta \leq 225°$, $$\rho(\theta) = \begin{pmatrix} 0.48074 - 0.00133(\theta - 202) + \\ 0.000542495(\theta - 202)^2 - \\ 0.000148596(\theta - 202)^3 + \\ 8.56691 \times 10^{-6}(\theta - 202)^4 - \\ 1.51835 \times 10^{-7}(\theta - 202)^5 \end{pmatrix} D_0;$$

-continued when $225° \leq \theta \leq 325°$, $$\rho(\theta) = \begin{pmatrix} 0.34927 - 0.00583(\theta - 225) + \\ 0.000183457(\theta - 225)^2 - \\ 5.41662 \times 10^{-6}(\theta - 225)^3 + \\ 1.25448 \times 10^{-7}(\theta - 225)^4 - \\ 1.7397 \times 10^{-9}(\theta - 225)^5 + \\ 1.27967 \times 10^{-11}(\theta - 225)^6 - \\ 3.77702 \times 10^{-14}(\theta - 225)^7 \end{pmatrix} D_0;$$

when $325° \leq \theta \leq 351°$, $$\rho(\theta) = \begin{pmatrix} 0.35169 - 0.000591024(\theta - 325) + \\ 0.000116942(\theta - 325)^2 - \\ 8.07623 \times 10^{-6}(\theta - 325)^3 + \\ 3.51208 \times 10^{-7}(\theta - 325)^4 - \\ 5.2224 \times 10^{-9}(\theta - 325)^5 \end{pmatrix} D_0;$$

when $351° \leq \theta \leq 360°$, $$\rho(\theta) = \begin{pmatrix} 0.37187 + 0.00178(\theta - 351) + \\ 0.000238541(\theta - 351)^2 - \\ 1.61095 \times 10^{-5}(\theta - 351)^3 \end{pmatrix} D_0;$$

wherein, θ is a value corresponding to the polar angle degree, ρ is a polar radius, and $D_0$ is an inner diameter of the cylinder groove of the barrel corresponding to said screw;

the shape curve of the cross-section of said right screw meets that:

when $0° \leq \theta° \leq 13°$, $$\rho(\theta) = \begin{pmatrix} 0.49645 + 0.0002565512\theta + 0.000149725\theta^2 - \\ 2.18392 \times 10^{-5}\theta^3 + 6.8663 \times 10^{-7}\theta^4 \end{pmatrix} D_0;$$

when $13° \leq \theta \leq 119°$, $$\rho(\theta) = \begin{pmatrix} 0.49672 + 0.0016(\theta - 13) - \\ 0.0001640439(\theta - 13)^2 + \\ 3.66195 \times 10^{-6}(\theta - 13)^3 - \\ 4.18633 \times 10^{-8}(\theta - 13)^4 + \\ 2.44243 \times 10^{-10}(\theta - 13)^5 - \\ 5.70929 \times 10^{-13}(\theta - 13)^6 \end{pmatrix} D_0;$$

when $119° \leq \theta \leq 360°$, $$\rho(\theta) = \begin{pmatrix} 0.39857 - 0.00147(\theta - 119) - \\ 2.94068 \times 10^{-5}(\theta - 119)^2 + \\ 6.44036 \times 10^{-7}(\theta - 119)^3 - \\ 4.79428 \times 10^{-9}(\theta - 119)^4 + \\ 1.70193 \times 10^{-11}(\theta - 119)^5 - \\ 2.30605 \times 10^{-14}(\theta - 119)^6 \end{pmatrix} D_0;$$

wherein, θ is a value corresponding to the polar angle degree, ρ is a polar radius, and $D_0$ is an inner diameter of the cylinder groove of the barrel corresponding to said screw.

2. A self-cleaning plasticizing venting and extruding apparatus by co-rotating non-twin multi-screws according to claim 1, characterized in that said driving mechanism comprises a main electric motor and a toothed gearing mechanism which are interconnected with each other, and said toothed gearing mechanism is connected to the central screw and the lateral screws respectively.

3. A self-cleaning plasticizing venting and extruding apparatus by co-rotating non-twin multi-screws according to claim 1, characterized in that the peak angle of the screw ridge of said central screw is in a range of 0-180°.

4. A self-cleaning plasticizing venting and extruding apparatus by co-rotating non-twin multi-screws according to claim 1, characterized in that the phase angle difference between the positions of said left screw and right screw is 0°, 90°, or 180°.

5. A self-cleaning plasticizing venting and extruding apparatus by co-rotating non-twin multi-screws, comprising a screw mechanism, a barrel, a feeding port, a venting port, a discharging port, and a driving mechanism, wherein said driving mechanism is provided at the ends of the barrel respectively, and is connected to the screw mechanism wherein said screw mechanism is provided inside the barrel, and placed horizontally, and the inner section of the barrel is divided into a solid transporting zone, a melting zone, a venting zone and a compounding and extruding zone; said feeding port is provided above the barrel of the solid transporting zone, said venting port is provided above the barrel of the venting zone, and both the feeding port and the venting port are communicated with the barrel; said discharging port is provided at the end of the barrel, characterized in that said screw mechanism comprises non-uniform shaped central screw and lateral screws, the axis of the central screw is coincided with that of the barrel, the lateral screws are engaged with the central screw, and the contour lines of the threads of the central screw and the lateral screws are tangent to the inner wall of the barrel; said driving mechanism is connected to the central screw and the lateral screws respectively, wherein:

said lateral screws are two screws, left screw and right screw, which are provided on both sides of the central screw respectively, and engaged with the central screw;

the inner cavity of said barrel is consisted of three cylinder grooves which are communicated with each other, each of the cylinder grooves is fitted with the left screw, the central screw and the right screw respectively; the central axis distances from the cylinder grooves on both sides to the cylinder groove at the central position are equal to the centerline distances from the central screw to the left screw and right screw;

the shape of the cross-section of said left screw is the same as the curve shape of the cross-section of the right screw; with the center points of the cylinder grooves of the barrel corresponding to the central screw and each of the lateral screws respectively as poles, and the rays elicited horizontally rightwards from the poles as polar axes, the shape curve of the cross-section of said central screw meets that:

when $0° \leq \theta \leq 27°$, $$\rho(\theta) = \begin{pmatrix} 0.28995 + 0.00029\theta + \\ 0.000104586\theta^2 + 1.35828 \times 10^{-6}\theta^3 \\ -6.80098 \times 10^{-8}\theta^4 + 3.45975 \times 10^{-9}\theta^5 \end{pmatrix} D_0;$$

-continued when $27° \leq \theta \leq 36°$, $$\rho(\theta) = \begin{pmatrix} 0.4847 + 0.01065(\theta - 27) - \\ 0.00186(\theta - 27)^2 + \\ 5.1776 \times 10^{-6}(\theta - 27)^3 + \\ 1.23985 \times 10^{-6}(\theta - 27)^4 \end{pmatrix} D_0;$$

when $36° \leq \theta \leq 60°$, $$\rho(\theta) = \begin{pmatrix} 0.4418 - 0.01131(\theta - 36) + \\ 0.000290563(\theta - 36)^2 - \\ 3.02877 \times 10^{-6}(\theta - 36)^3 - \\ 2.66377 \times 10^{-8}(\theta - 36)^4 \end{pmatrix} D_0;$$

when $60° \leq \theta \leq 120°$, $$\rho(\theta) = \begin{pmatrix} 0.287 - 0.0025(\theta - 60) + \\ 4.57118 \times 10^{-5}(\theta - 60)^2 - \\ 1.90487 \times 10^{-7}(\theta - 60)^3 + \\ 2.28021 \times 10^{-9}(\theta - 60)^4 \end{pmatrix} D_0;$$

when $120° \leq \theta \leq 147°$, $$\rho(\theta) = \begin{pmatrix} 0.28995 + 0.0029(\theta - 120) + \\ 0.000104586(\theta - 120)^2 + \\ 1.35828 \times 10^{-6}(\theta - 120)^3 - \\ 6.80098 \times 10^{-8}(\theta - 120)^4 + \\ 3.45975 \times 10^{-9}(\theta - 120)^5 \end{pmatrix} D_0;$$

when $147° \leq \theta \leq 156°$, $$\rho(\theta) = \begin{pmatrix} 0.4847 + 0.01065(\theta - 147) - \\ 0.00186(\theta - 147)^2 + \\ 5.1176 \times 10^{-6}(\theta - 147)^3 + \\ 1.23985 \times 10^{-6}(\theta - 147)^4 \end{pmatrix} D_0;$$

when $156° \leq \theta \leq 180°$, $$\rho(\theta) = \begin{pmatrix} 0.4418 - 0.01131(\theta - 156) + \\ 0.000290563(\theta - 156)^4 - \\ 3.02877 \times 10^{-6}(\theta - 156)^3 - \\ 2.66377 \times 10^{-8}(\theta - 156)^4 \end{pmatrix} D_0;$$

when $180° \leq \theta \leq 240°$, $$\rho(\theta) = \begin{pmatrix} 0.287 - 0.0025(\theta - 180) + \\ 4.57118 \times 10^{-5}(\theta - 180)^2 - \\ 1.90487 \times 10^{-7}(\theta - 180)^3 + \\ 2.28021 \times 10^{-9}(\theta - 180)^4 \end{pmatrix} D_0;$$

when $240° \leq \theta \leq 267°$, $$\rho(\theta) = \begin{pmatrix} 0.28995 + 0.0029(\theta - 240) + \\ 0.000104586(\theta - 240)^2 + \\ 1.35828 \times 10^{-6}(\theta - 240)^3 - \\ 6.80098 \times 10^{-8}(\theta - 240)^4 + \\ 3.45975 \times 10^{-9}(\theta - 240)^5 \end{pmatrix} D_0;$$

-continued when $267° \leq \theta \leq 270°$, $$\rho(\theta) = \begin{pmatrix} 0.4847 + 0.01065(\theta - 267) - \\ 0.00186(\theta - 267)^2 + \\ 5.1776 \times 10^{-6}(\theta - 267)^3 + \\ 1.23985 \times 10^{-6}(\theta - 267)^4 \end{pmatrix} D_0;$$

when $270° \leq \theta \leq 300°$, $$\rho(\theta) = \begin{pmatrix} 0.4418 - 0.001131(\theta - 270) + \\ 0.000290563(\theta - 270)^2 - \\ 3.02877 \times 10^{-6}(\theta - 270)^3 - \\ 2.66377 \times 10^{-8}(\theta - 270)^4 \end{pmatrix} D_0;$$

when $300° \leq \theta \leq 360°$, $$\rho(\theta) = \begin{pmatrix} 0.287 - 0.0025(\theta - 180) + \\ 4.57118 \times 10^{-5}(\theta - 180)^2 - \\ 1.90487 \times 10^{-7}(\theta - 180)^3 + \\ 2.28021 \times 10^{-9}(\theta - 180)^4 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw;

the shape curve of the cross-section of said right screw meets that:

when $0° \leq \theta \leq 85°$, $$\rho(\theta) = \begin{pmatrix} 0.32013 + 0.0006685205\theta + 0.00011173\theta^2 - \\ 5.88903 \times 10^{-6}\theta^3 + 1.80316 \times 10^{-7}\theta^4 - \\ 3.03623 \times 10^{-9}\theta^5 + \\ 2.64496 \times 10^{-11}\theta^6 - 9.32845 \times 10^{-14}\theta^7 \end{pmatrix} D_0;$$

when $85° \leq \theta \leq 95°$, $$\rho(\theta) = \begin{pmatrix} 0.494681 + 0.00179(\theta - 85) - \\ 0.000479273(\theta - 85)^2 + \\ 0.00010662(\theta - 85)^3 - \\ 1.63619 \times 10^{-5}(\theta - 85)^4 + \\ 1.24974 \times 10^{-6}(\theta - 85)^5 - \\ 3.77964 \times 10^{-8}(\theta - 85)^6 \end{pmatrix} D_0;$$

when $95° \leq \theta \leq 180°$, $$\rho(\theta) = \begin{pmatrix} 0.494832 - 0.000761246(\theta - 95) - \\ 0.000126101(\theta - 95)^2 + \\ 4.25652 \times 10^{-6}(\theta - 95)^3 - \\ 7.13683 \times 10^{-8}(\theta - 95)^4 + \\ 5.9942 \times 10^{-10}(\theta - 95)^5 - \\ 1.98695 \times 10^{-12}(\theta - 95)^6 \end{pmatrix} D_0;$$

when $180° \leq \theta \leq 360°$, $$\rho(\theta) = \begin{pmatrix} 0.31789 - 0.00133(\theta - 180) - \\ 8.60877 \times 10^{-6}(\theta - 180)^2 + \\ 5.0898 \times 10^{-7}(\theta - 180)^3 - \\ 7.16212 \times 10^{-9}(\theta - 180)^4 + \\ 5.3005 \times 10^{-11}(\theta - 180)^5 - \\ 2.05365 \times 10^{-13}(\theta - 180)^6 + \\ 3.64972 \times 10^{-16}(\theta - 180)^7 - \\ 1.76708 \times 10^{-19}(\theta - 180)^8 \end{pmatrix} D_0;$$

wherein, $\theta$ is a value corresponding to the polar angle degree, $\rho$ is a polar radius, and $D_0$ is an inner diameter of the cylinder groove of the barrel corresponding to said screw;

or, the shape curve of the cross-section of said central screw meets that:

when $0° \leq \theta \leq 50°$, $\rho(\theta) = 0.5D_0$;
when $50° \leq \theta \leq 90°$, $$\rho(\theta) = \begin{pmatrix} 0.5 - 0.00309(\theta - 50) + \\ 0.000168331(\theta - 50)^2 - \\ 8.44083 \times 10^{-6}(\theta - 50)^3 + \\ 2.19035 \times 10^{-7}(\theta - 50)^4 - \\ 2.06434 \times 10^{-9}(\theta - 50)^5 \end{pmatrix} D_0;$$

when $90° \leq \theta \leq 101°$, $\rho(\theta) = 0.455D_0$;
when $101° \leq \theta \leq 181°$, $$\rho(\theta) = \begin{pmatrix} 0.455 - 0.00143(\theta - 101) - \\ 0.000793059(\theta - 101)^2 + \\ 6.51522 \times 10^{-5}(\theta - 101)^3 - \\ 2.66487 \times 10^{-6}(\theta - 101)^4 + \\ 6.20495 \times 10^{-8}(\theta - 101)^5 - \\ 8.26745 \times 10^{-10}(\theta - 101)^6 + \\ 5.86449 \times 10^{-12}(\theta - 101)^7 - \\ 1.71691 \times 10^{-14}(\theta - 101)^8 \end{pmatrix} D_0;$$

when $181° \leq \theta \leq 193°$, $\rho(\theta) = 0.25D_0$;
when $193° \leq \theta \leq 244°$, $$\rho(\theta) = \begin{pmatrix} 0.25 + 0.00031617 8(\theta - 193) - \\ 0.000107545(\theta - 193)^2 + \\ 0.00002068(\theta - 193)^3 - \\ 1.60164 \times 10^{-6}(\theta - 193)^4 + \\ 6.82867 \times 10^{-8}(\theta - 193)^5 - \\ 1.63573 \times 10^{-9}(\theta - 193)^6 + \\ 2.06803 \times 10^{-11}(\theta - 193)^7 - \\ 1.07375 \times 10^{-13}(\theta - 193)^8 \end{pmatrix} D_0;$$

when $244° \leq \theta \leq 353°$, $$\rho(\theta) = \begin{pmatrix} 0.31875 - 0.00104(\theta - 244) - \\ 3.31524 \times 10^{-5}(\theta - 244)^2 + \\ 4.32237 \times 10^{-6}(\theta - 244)^3 - \\ 1.67168 \times 10^{-7}(\theta - 244)^4 + \\ 3.54572 \times 10^{-9}(\theta - 244)^5 - \\ 4.16652 \times 10^{-11}(\theta - 244)^6 + \\ 2.55218 \times 10^{-13}(\theta - 244)^7 - \\ 6.34643 \times 10^{-16}(\theta - 244)^8 \end{pmatrix} D_0;$$

when $353° \leq \theta \leq 360°$, $\rho(\theta) = 0.5D_0$;

wherein, $\theta$ is a value corresponding to the polar angle degree, $\rho$ is a polar radius, and $D_0$ is an inner diameter of the cylinder groove of the barrel corresponding to said screw;

the shape curve of the cross-section of said right screw meets that:

when $0° \leq \theta \leq 12°$, $\rho(\theta) = 0.5D_0$;
when $12° \leq \theta \leq 93°$, $$\rho(\theta) = \begin{pmatrix} 0.5 - 0.00165(\theta - 12) - \\ 0.000134915(\theta - 12)^2 + \\ 0.000011814(\theta - 12)^3 - \\ 4.87051 \times 10^{-7}(\theta - 12)^4 + \\ 1.1766 \times 10^{-8}(\theta - 12)^5 - \\ 1.64659 \times 10^{-10}(\theta - 12)^6 + \\ 1.23355 \times 10^{-12}(\theta - 12)^7 - \\ 3.82327 \times 10^{-15}(\theta - 12)^8 \end{pmatrix} D_0;$$

when $93° \leq \theta \leq 173°$, $$\rho(\theta) = \begin{pmatrix} 0.44967 - 0.0012(\theta - 93) - \\ 0.000680386(\theta - 93)^2 + \\ 5.15007 \times 10^{-5}(\theta - 93)^3 - \\ 1.99396 \times 10^{-6}(\theta - 93)^4 + \\ 4.48589 \times 10^{-8}(\theta - 93)^5 - \\ 5.85347 \times 10^{-10}(\theta - 93)^6 + \\ 4.10152 \times 10^{-12}(\theta - 93)^7 - \\ 1.19263 \times 10^{-14}(\theta - 93)^8 \end{pmatrix} D_0;$$

when $173° \leq \theta \leq 230°$, $\rho(\theta) = 0.25D_0$;
when $230° \leq \theta \leq 272°$, $$\rho(\theta) = \begin{pmatrix} 0.25 + 0.000575232(\theta - 230) - \\ 0.000134433(\theta - 230)^2 + \\ 2.282201 \times 10^{-5}(\theta - 230)^3 - \\ 1.7105 \times 10^{-6}(\theta - 230)^4 + \\ 7.37301 \times 10^{-8}(\theta - 230)^5 - \\ 1.86726 \times 10^{-9}(\theta - 230)^6 + \\ 2.61628 \times 10^{-11}(\theta - 230)^7 - \\ 1.5782 \times 10^{-13}(\theta - 230)^8 \end{pmatrix} D_0;$$

-continued when $272° \le \theta \le 283°$, $\rho(\theta) = 0.295D_0$;
when $283° \le \theta \le 360°$, $$\rho(\theta) = \begin{pmatrix} 0.295 + 0.000132721(\theta - 283) + \\ 4.58737 \times 10^{-5}(\theta - 283)^2 - \\ 3.34926 \times 10^{-6}(\theta - 283)^3 + \\ 2.15388 \times 10^{-7}(\theta - 283)^4 - \\ 6.89212 \times 10^{-9}(\theta - 283)^5 + \\ 1.18802 \times 10^{-10}(\theta - 283)^6 - \\ 1.04706 \times 10^{-12}(\theta - 283)^7 + \\ 3.70486 \times 10^{-15}(\theta - 283)^8 \end{pmatrix} D_0;$$

wherein, θ is a value corresponding to the polar angle degree, ρ is a polar radius, and $D_0$ is an inner diameter of the cylinder groove of the barrel corresponding to said screw.

6. A self-cleaning plasticizing venting and extruding apparatus by co-rotating non-twin multi-screws, comprising a screw mechanism, a barrel, a feeding port, a venting port, a discharging port, and a driving mechanism, wherein said driving mechanism is provided at the ends of the barrel respectively, and is connected to the screw mechanism wherein said screw mechanism is provided inside the barrel, and placed horizontally, and the inner section of the barrel is divided into a solid transporting zone, a melting zone, a venting zone and a compounding and extruding zone; said feeding port is provided above the barrel of the solid transporting zone, said venting port is provided above the barrel of the venting zone, and both the feeding port and the venting port are communicated with the barrel; said discharging port is provided at the end of the barrel, characterized in that said screw mechanism comprises non-uniform shaped central screw and lateral screws, the axis of the central screw is coincided with that of the barrel, the lateral screws are engaged with the central screw, and the contour lines of the threads of the central screw and the lateral screws are tangent to the inner wall of the barrel; said driving mechanism is connected to the central screw and the lateral screws respectively, wherein:

said lateral screw is one screw, which is provided on the side of the central screw, and engaged with the central screw; the inner cavity of said barrel is consisted of two cylinder grooves which are communicated with each other, each of the cylinder grooves is fitted with the lateral screw, and the central screw respectively; the central axis distance between the two cylinder grooves is equal to the centerline distance between the central screw and the lateral screw;

with the center points of the cylinder grooves of the barrel corresponding to the central screw and the lateral screw respectively as poles, and the rays elicited horizontally rightwards from the poles as polar axes, the shape curve of the cross-section of said central screw is symmetric with respective to the ray of θ=120° and the ray of θ=240°, and the polar angle is within 0°≤θ≤120°, the corresponding curve meets that:

when $0 \le \theta \le 2°$, $\rho(\theta) = 0.5D_0$;
when $2° \le \theta \le 58°$, $$\rho(\theta) = \begin{pmatrix} 0.5 - 0.00246(\theta - 2) + \\ 0.00106(\theta - 2)^2 - 1.67316 \times 10^{-4}(\theta - 2)^3 + \\ 1.08849 \times 10^{-5}(\theta - 2)^4 - \\ 3.74006 \times 10^{-7}(\theta - 2)^5 + \\ 7.15583 \times 10^{-9}(\theta - 2)^6 - \\ 7.21345 \times 10^{-11}(\theta - 2)^7 + \\ 2.98968 \times 10^{-13}(\theta - 2)^8 \end{pmatrix} D_0;$$

when $58° \le \theta \le 62°$, $\rho(\theta) = 0.4D_0$;
when $62° \le \theta \le 118°$, $$\rho(\theta) = \begin{pmatrix} 0.4 - 7.16547 \times 10^{-4}(\theta - 62) + \\ 3.66366 \times 10^{-4}(\theta - 62)^2 - \\ 5.72993 \times 10^{-5}(\theta - 62)^3 + \\ 4.76052 \times 10^{-6}(\theta - 62)^4 - \\ 2.09619 \times 10^{-7}(\theta - 62)^5 + \\ 5.0282 \times 10^{-9}(\theta - 62)^6 - \\ 6.18021 \times 10^{-11}(\theta - 62)^7 + \\ 3.03396 \times 10^{-13}(\theta - 62)^8 \end{pmatrix} D_0;$$

when $118° \le \theta \le 120°$, $\rho(\theta) = 0.5D_0$ wherein, θ is a value corresponding to the polar angle degree, ρ is a polar radius, and $D_0$ is an inner diameter of the cylinder groove of the barrel corresponding to said screw;

the shape curve of the cross section of said lateral screw is symmetric with respective to the ray of θ=0° and the ray of θ=180° (ie., the positive direction of the X axial in the orthogonal coordinate system), and the polar angle is within 0°≤θ≤180°, the corresponding curve meets that:

when $0° \le \theta \le 3°$, $\rho(\theta) = 0.4D_0$;
when $3° \le \theta \le 87$, $$\rho(\theta) = \begin{pmatrix} 0.40053 + 1.91042 \times 10^{-4}(\theta - 3) - \\ 5.44854 \times 10^{-5}(\theta - 3)^2 + \\ 5.78786 \times 10^{-6}(\theta - 3)^3 - \\ 2.60181 \times 10^{-7}(\theta - 3)^4 + \\ 6.77081 \times 10^{-9}(\theta - 3)^5 - \\ 1.00659 \times 10^{-10}(\theta - 3)^6 + \\ 7.9546 \times 10^{-13}(\theta - 3)^7 - \\ 2.59711 \times 10^{-15}(\theta - 3)^8 \end{pmatrix} D_0;$$

when $87° \le \theta \le 93°$, $\rho(\theta) = 0.5D_0$;
when $93° \le \theta \le 177°$, $$\rho(\theta) = \begin{pmatrix} 0.5 + 5.59592 \times 10^{-4}(\theta - 93) - \\ 3.44997 \times 10^{-4}(\theta - 93)^2 + \\ 1.95669 \times 10^{-5}(\theta - 93)^3 - \\ 6.225514 \times 10^{-7}(\theta - 93)^4 + \\ 1.2176 \times 10^{-8}(\theta - 93)^5 - \\ 1.43316 \times 10^{-10}(\theta - 93)^6 + \\ 9.29081 \times 10^{-13}(\theta - 93)^7 - \\ 2.54457 \times 10^{-15}(\theta - 93)^8 \end{pmatrix} D_0;$$

when $177° \le \theta \le 180°$, $\rho(\theta) = 0.4D_0$;

wherein, θ is a value corresponding to the polar angle degree, ρ is a polar radius, and $D_0$ is an inner diameter of the cylinder groove of the barrel corresponding to said screw;

or, the shape curve of the cross-section of said central screw is symmetric with respective to the ray of θ=0° and the ray of θ=180°, and the polar angle is within 0°≤θ≤180°, the corresponding curve meets that:

when $0° \le \theta \le 15°$, $\rho(\theta) = 0.5D_0$;
when $15° \le \theta \le 69.5°$, $$\rho(\theta) = \begin{pmatrix} 0.5 - 0.00188(\theta-15) - \\ 8.21227 \times 10^{-4}(\theta-15)^2 + \\ 8.53313 \times 10^{-5}(\theta-15)^3 - \\ 4.61141 \times 10^{-6}(\theta-15)^4 + \\ 1.48589 \times 10^{-7}(\theta-15)^5 - \\ 2.82368 \times 10^{-9}(\theta-15)^6 + \\ 2.90967 \times 10^{-11}(\theta-15)^7 - \\ 1.25091 \times 10^{-13}(\theta-15)^8 \end{pmatrix} D_0;$$

when $69.5° \le \theta \le 110.5°$, $\rho(\theta) = 0.35714D_0$;
when $110.5° \le \theta \le 165°$, $$\rho(\theta) = \begin{pmatrix} 0.35714 + 3.98268 \times 10^{-4}(\theta-110.5) - \\ 1.91593 \times 10^{-4}(\theta-110.5)^2 + \\ 3.54059 \times 10^{-5}(\theta-110.5)^3 - \\ 2.64776 \times 10^{-6}(\theta-110.5)^4 + \\ 1.08848 \times 10^{-7}(\theta-110.5)^5 - \\ 2.49656 \times 10^{-9}(\theta-110.5)^6 + \\ 3.00627 \times 10^{-11}(\theta-110.5)^7 - \\ 1.48135 \times 10^{-13}(\theta-110.5)^8 \end{pmatrix} D_0;$$

when $165° \le \theta \le 180°$, $\rho(\theta) = 0.5D_0$;

wherein, θ is a value corresponding to the polar angle degree, ρ is a polar radius, and $D_0$ is an inner diameter of the cylinder groove of the barrel corresponding to said screw;

the shape curve of the cross-section of said lateral screw is symmetric with respective to the ray of θ=0° and the ray of θ=180°, and the polar angle is within 0°≤θ≤180°, the corresponding curve meets that:

when $0° \le \theta \le 41°$, $\rho(\theta) = 0.5D_0$;
when $41° \le \theta \le 150°$, $$\rho(\theta) = \begin{pmatrix} 0.5 + 5.80648 \times 10^{-4}(\theta-41) - \\ 1.0674 \times 10^{-4}(\theta-41)^2 - \\ 4.94415 \times 10^{-7}(\theta-41)^3 \\ 1.14699 \times 10^{-7}(\theta-41)^4 - \\ 2.86057 \times 10^{-9}(\theta-41)^5 \\ 3.31268 \times 10^{-11}(\theta-41)^6 - \\ 1.89458 \times 10^{-13}(\theta-41)^7 \\ 4.31702 \times 10^{-16}(\theta-41)^8 \end{pmatrix} D_0;$$

when $150° \le \theta \le 180°$, $\rho(\theta) = 0.35714D_0$;

wherein, θ is a value corresponding to the polar angle degree, ρ is a polar radius, and $D_0$ is an inner diameter of the cylinder groove of the barrel corresponding to said screw;

or, the shape curve of the cross-section of said central screw is symmetric with respective to the ray of θ=120° and the ray of θ=240°, and the polar angle is within 0°≤θ≤120°, the corresponding curve meets that:

when $0° \le \theta \le 10°$, $\rho(\theta) = 0.5D_0$;
when $10° \le \theta \le 58°$, $$\rho(\theta) = \begin{pmatrix} 0.5 - 0.00831(\theta-10) + \\ 2.69315 \times 10^{-4}(\theta-10)^2 - \\ 2.05095 \times 10^{-5}(\theta-10)^3 + \\ 1.59416 \times 10^{-6}(\theta-10)^4 - \\ 6.95534 \times 10^{-8}(\theta-10)^5 + \\ 1.65362 \times 10^{-9}(\theta-10)^6 - \\ 2.02237 \times 10^{-11}(\theta-10)^7 + \\ 9.97816 \times 10^{-14}(\theta-10)^8 \end{pmatrix} D_0;$$

when $58° \le \theta \le 62°$, $\rho(\theta) = 0.357143D_0$;
when $62° \le \theta \le 110°$, $$\rho(\theta) = \begin{pmatrix} 0.5714 - 4.90697 \times 10^{-5}(\theta-62) + \\ 1.02434 \times 10^{-5}(\theta-62)^2 \\ 1.22629 \times 10^{-6}(\theta-62)^3 + \\ 1.76059 \times 10^{-7}(\theta-62)^4 - \\ 1.56233 \times 10^{-8}(\theta-62)^5 + \\ 5.21936 \times 10^{-10}(\theta-62)^6 - \\ 7.85637 \times 10^{-12}(\theta-62)^7 + \\ 4.47471 \times 10^{-14}(\theta-62)^8 \end{pmatrix} D_0;$$

when $110° \le \theta \le 120°$, $\rho(\theta) = 0.5D_0$;

wherein, θ is a value corresponding to the polar angle degree, ρ is a polar radius, and $D_0$ is an inner diameter of the cylinder groove of the barrel corresponding to said screw;

the shape curve of the cross-section of said lateral screw is symmetric with respective to the ray of θ=0° and the ray of θ=180°, and the polar angle is within 0°≤θ≤180°, the corresponding curve meets that:

when $0° \le \theta \le 30°$, $\rho(\theta) = 0.35714D_0$;
when $30 \le \theta \le 174°$, $$\rho(\theta) = \begin{pmatrix} 0.35714 - 1.2981 \times 10^{-4}(\theta-30) + \\ 4.15281 \times 10^{-5}(\theta-30)^2 - \\ 2.15177 \times 10^{-6}(\theta-30)^3 + \\ 6.69687 \times 10^{-8}(\theta-30)^4 - \\ 1.10347 \times 10^{-9}(\theta-30)^5 + \\ 9.90148 \times 10^{-12}(\theta-30)^6 - \\ 4.55739 \times 10^{-14}(\theta-30)^7 + \\ 8.37526 \times 10^{-17}(\theta-30)^8 \end{pmatrix} D_0;$$

when $174° \le \theta \le 180°$, $\rho(\theta) = 0.5D_0$;

wherein, θ is a value corresponding to the polar angle degree, ρ is a polar radius, and $D_0$ is an inner diameter of the cylinder groove of the barrel corresponding to said screw;

or, the shape curve of the cross-section of said central screw is symmetric with respective to the ray of θ=0°, the ray of θ=90°, and the ray of θ=270°, and the polar angle is within 0°≤θ≤90°, the corresponding curve meets that:

when $0° \leq \theta \leq 3°$, $\rho(\theta) = 0.5D_0$;
when $3° \leq \theta \leq 87°$, $$\rho(\theta) = \begin{pmatrix} 0.5 - 0.00776(\theta - 3) + \\ 3.35014 \times 10^{-5}(\theta - 3)^2 + \\ 8.68488 \times 10^{-6}(\theta - 3)^3 - \\ 3.48947 \times 10^{-7}(\theta - 3)^4 + \\ 6.34905 \times 10^{-9}(\theta - 3)^5 - \\ 5.62555 \times 10^{-11}(\theta - 3)^6 + \\ 1.98268 \times 10^{-13}(\theta - 3)^7 \end{pmatrix} D_0;$$

when $87° \leq \theta \leq 90°$, $\rho(\theta) = 0.5D_0$;

wherein, θ is a value corresponding to the polar angle degree, ρ is a polar radius, and $D_0$ is an inner diameter of the cylinder groove of the barrel corresponding to said screw;

the shape curve of the cross-section of said lateral screw is symmetric with respective to the ray of θ=0° and the ray of θ=180°, and the polar angle is within 0°≤θ≤180°, the corresponding curve meets that:

when $0° \leq \theta \leq 12°$, $\rho(\theta) = 0.35714D_0$;
when $12° \leq \theta \leq 180°$, $$\rho(\theta) = \begin{pmatrix} 0.35714 + 1.16393 \times 10^{-4}(\theta - 12) + \\ 1.09189 \times 10^{-6}(\theta - 12)^2 + \\ 1.02469 \times 10^{-7}(\theta - 12)^3 - \\ 7.39494 \times 10^{-10}(\theta - 12)^4 - \\ 2.22006 \times 10^{-12}(\theta - 12)^5 \\ 5.1641 \times 10^{-14}(\theta - 12)^6 - \\ 1.7693 \times 10^{-16}(\theta - 12)^7 \end{pmatrix} D_0;$$

wherein, θ is a value corresponding to the polar angle degree, ρ is a polar radius, and $D_0$ is the inner diameter of the cylinder groove of the barrel corresponding to said screw;

or, the shape curve of the cross-section of said central screw is symmetric with respective to the ray of θ=0°, the ray of θ=72°, the ray of θ=144°, the ray of θ=216°, and the ray of θ=288°, and the polar angle is within 0°≤θ≤72°, the corresponding curve meets that:

when $0° \leq \theta \leq 4°$, $\rho(\theta) = 0.5D_0$;
when $4° \leq \theta \leq 34°$, $$\rho(\theta) = \begin{pmatrix} 0.5 - 0.02464(\theta - 4) + \\ 0.00617(\theta - 4)^2 - \\ 9.00044 \times 10^{-4}(\theta - 4)^3 + \\ 7.03593 \times 10^{-5} - \\ 2.98822 \times 10^{-6}(\theta - 4)^5 + \\ 6.51822 \times 10^{-8}(\theta - 4)^6 - \\ 5.71897 \times 10^{-10}(\theta - 4)^7 \end{pmatrix} D_0;$$

when $34° \leq \theta \leq 38°$, $\rho(\theta) = 0.4D_0$;
when $38° \leq \theta \leq 68°$, $$\rho(\theta) = \begin{pmatrix} 0.4 + 2.66133 \times 10^{-4}(\theta - 38) - \\ 4.49843 \times 10^{-5}(\theta - 38)^2 + \\ 3.42164 \times 10^{-5}(\theta - 38)^3 - \\ 4.56139 \times 10^{-6}(\theta - 38)^4 + \\ 3.02712 \times 10^{-7}(\theta - 38)^5 - \\ 9.6014 \times 10^{-9}(\theta - 38)^6 + \\ 1.16449 \times 10^{-10}(\theta - 38)^7 \end{pmatrix} D_0;$$

when $68° \leq \theta \leq 72°$, $\rho(\theta) = 0.5D_0$;

wherein, θ is a value corresponding to the polar angle degree, ρ is a polar radius, and $D_0$ is an inner diameter of the cylinder groove of the barrel corresponding to said screw;

the shape curve of the cross-section of said lateral screw is symmetric with respective to the ray of θ=0° and the ray of θ=180°, and the polar angle is within 0°≤θ≤180°, the corresponding curve meets that:

when $0° \leq \theta \leq 20°$, $\rho(\theta) = 0.4D_0$;
when $20° \leq \theta \leq 170°$, $$\rho(\theta) = \begin{pmatrix} 0.4 + 4.16738 \times 10^{-4}(\theta - 20) - \\ 1.72721 \times 10^{-5}(\theta - 20)^2 + \\ 7.47552 \times 10^{-7}(\theta - 20)^3 - \\ 1.38142 \times 10^{-8}(\theta - 20)^4 + \\ 1.46263 \times 10^{-10}(\theta - 20)^5 - \\ 9.05881 \times 10^{-13}(\theta - 20)^6 + \\ 3.10626 \times 10^{-15}(\theta - 20)^7 - \\ 4.67939 \times 10^{-18}(\theta - 20)^8 \end{pmatrix} D_0;$$

when $170° \leq \theta \leq 180°$, $\rho(\theta) = 0.5D_0$;

wherein, θ is a value corresponding to the polar angle degree, ρ is a polar radius, and $D_0$ is an inner diameter of the cylinder groove of the barrel corresponding to said screw.

7. A self-cleaning plasticizing venting and extruding method by co-rotating non-twin multi-screws carried out by using an apparatus according to claim 1, characterized by particularly comprising the steps of:

(1) after the materials enter the barrel from the feeding port, the central screw and the lateral screw co-rotate along the axis of the respective screws under the drive of the driving mechanism; when the materials enter the solid transporting zone, the feed materials are transported under the co-effects of the axial transporting force from the central screw and the lateral screw and the friction force from the central screw and the lateral screw, so that the materials are forced to move towards the discharging port direction, at the same time the gases in the materials are discharged from the feeding port as the materials are heated;

(2) when the materials move to the melting zone, the central screw and the lateral screw rotate in a relatively engaging mode so as to generate a periodical transport space for transporting the materials; the materials are melt under the co-effects of the friction heat generated from the high speed rotation of each of the screws and at the same time the external heat on the barrel; and the melting process is accelerated under the interwiping effect between the central screw and the lateral screw and the asymmetrical effect of the transport space, so that the materials become melts;

(3) when the melts enter the venting zone, the space consisted of the central screw and the lateral screw and the inner cavity of the barrel is suddenly enlarged, the materials are continuously stirred by the rotation of the central screw and the lateral screw so that the gases are discharged from the venting port, and the melts move further towards the discharging port direction;

(4) when the melts enter the compounding and extruding zone, the melts proceed under the periodical space effect generated by the rotation of the central screw and the lateral screw, the interfaces are facilitated to reorientate and regenerate continuously under the interwiping effect between the central screw and the lateral screw and the asymmetrical effect of the transport space, and the materials are compounded and plasticized, at the same time a self-cleaning effect is carried out by the interwiping effect between each of the screws, so that the melts are stably extruded from the discharging port.

\* \* \* \* \*